United States Patent
Gordon

(10) Patent No.: US 9,612,851 B2
(45) Date of Patent: Apr. 4, 2017

(54) DEPLOYING DATA-PATH-RELATED PLUG-INS

(71) Applicant: STORONE LTD., Ra'anana (IL)

(72) Inventor: Raz Gordon, Hadera (IL)

(73) Assignee: STORONE LTD., Ra'anana (IL)

( * ) Notice: Subject to any disclaimer, the term of this patent is extended or adjusted under 35 U.S.C. 154(b) by 0 days.

(21) Appl. No.: 14/774,007

(22) PCT Filed: Jan. 19, 2014

(86) PCT No.: PCT/IL2014/050063
§ 371 (c)(1),
(2) Date: Sep. 9, 2015

(87) PCT Pub. No.: WO2014/147607
PCT Pub. Date: Sep. 25, 2014

(65) Prior Publication Data
US 2016/0026481 A1 Jan. 28, 2016

Related U.S. Application Data

(60) Provisional application No. 61/803,868, filed on Mar. 21, 2013.

(51) Int. Cl.
*G06F 9/45* (2006.01)
*G06F 9/445* (2006.01)
(Continued)

(52) U.S. Cl.
CPC ............ *G06F 9/44526* (2013.01); *G06F 8/60* (2013.01); *H04L 41/0823* (2013.01);
(Continued)

(58) Field of Classification Search
CPC .......... G06F 8/60–8/68; G06F 9/44526; G06F 11/1446; G06F 11/3409; G06F 2201/81; H04L 41/0823
See application file for complete search history.

(56) References Cited

U.S. PATENT DOCUMENTS 5,987,505 A   11/1999 Fry et al.
6,538,669 B1   3/2003 Lagueux, Jr. et al.
(Continued)

FOREIGN PATENT DOCUMENTS

CN    101188569 A    5/2008
EP    1306754 A1    5/2003
(Continued)

OTHER PUBLICATIONS

Sten L. Amundsen et al., "A resource and context model for mobile middleware", [Online], 2008, pp. 143-153, [Retrieved from Internet on Nov. 7, 2016], <http://heim.ifi.uio.no/~frank/Publications/puc2008.pdf>.*

(Continued)

*Primary Examiner* — Thuy Dao
*Assistant Examiner* — Ziaul A Chowdhury
(74) *Attorney, Agent, or Firm* — Oliff PLC

(57) ABSTRACT

A method for deploying a data-path-related plug-in for a logical storage entity of a storage system, the method comprising: deploying the data-path-related plug-in for the logical storage entity, wherein the deploying includes creating a plug-in inclusive data-path specification and wherein the plug-in inclusive data-path specification includes operation of the data-path-related plug-in; and creating a verification data-path specification, wherein the verification data-path specification does not include operation of the data-path-related plug-in and wherein a task executed in a verification data path, having the verification data-path specification, generates verification data that enables validation of given data generated by the task being executed in a plug-in inclusive data-path having the plug-in inclusive data-path specification.

17 Claims, 8 Drawing Sheets

(51) Int. Cl.
*H04L 12/24* (2006.01)
*G06F 11/14* (2006.01)
*G06F 11/34* (2006.01)

(52) U.S. Cl.
CPC ...... *G06F 11/1446* (2013.01); *G06F 11/3409* (2013.01); *G06F 2201/81* (2013.01)

(56) References Cited

U.S. PATENT DOCUMENTS

| | | |
|---|---|---|
| 6,804,819 B1 | 10/2004 | Bates et al. |
| 6,907,501 B2 | 6/2005 | Tariq et al. |
| 6,977,927 B1 | 12/2005 | Bates et al. |
| 6,988,087 B2 | 1/2006 | Kanai et al. |
| 7,020,697 B1* | 3/2006 | Goodman ............... G06Q 10/10 709/223 |
| 7,434,002 B1 | 10/2008 | Zedlewski et al. |
| 7,463,648 B1 | 12/2008 | Eppstein et al. |
| 7,525,957 B2 | 4/2009 | Scherer et al. |
| 7,584,337 B2 | 9/2009 | Rowan et al. |
| 7,594,002 B1 | 9/2009 | Thorpe et al. |
| 7,702,757 B2 | 4/2010 | Bergman et al. |
| 7,774,572 B2 | 8/2010 | Yokohata et al. |
| 7,831,773 B2 | 11/2010 | Zedlewski et al. |
| 7,844,968 B1 | 11/2010 | Markov |
| 7,992,031 B2 | 8/2011 | Chavda et al. |
| 8,176,358 B2 | 5/2012 | Bensinger |
| 8,194,339 B2 | 6/2012 | Wilson |
| 8,413,139 B2* | 4/2013 | Shukla ................. G06F 9/44526 718/1 |
| 9,319,274 B1* | 4/2016 | Wei ....................... H04L 41/0823 |
| 2002/0004912 A1 | 1/2002 | Fung |
| 2002/0103969 A1 | 8/2002 | Koizumi et al. |
| 2002/0152181 A1 | 10/2002 | Kanai et al. |
| 2002/0156984 A1 | 10/2002 | Padovano |
| 2003/0131068 A1 | 7/2003 | Hoshino et al. |
| 2003/0135609 A1 | 7/2003 | Carlson et al. |
| 2003/0145038 A1 | 7/2003 | Bin Tariq et al. |
| 2003/0188085 A1 | 10/2003 | Arakawa et al. |
| 2003/0217358 A1* | 11/2003 | Thurston ................... G06F 8/60 717/174 |
| 2004/0006589 A1 | 1/2004 | Maconi et al. |
| 2004/0054850 A1 | 3/2004 | Fisk |
| 2004/0111514 A1 | 6/2004 | Chase et al. |
| 2004/0123062 A1 | 6/2004 | Dalal et al. |
| 2004/0230753 A1 | 11/2004 | Amiri et al. |
| 2005/0027938 A1 | 2/2005 | Burkey |
| 2005/0081086 A1 | 4/2005 | Williams |
| 2005/0278360 A1 | 12/2005 | Boyd et al. |
| 2006/0041644 A1* | 2/2006 | Henseler ............. G06F 9/44526 709/220 |
| 2006/0129759 A1 | 6/2006 | Bartlett et al. |
| 2006/0236061 A1 | 10/2006 | Koclanes |
| 2007/0233883 A1 | 10/2007 | De Lutiis et al. |
| 2008/0091843 A1 | 4/2008 | Kulkarni |
| 2008/0168432 A1 | 7/2008 | Ayachitula et al. |
| 2008/0209142 A1 | 8/2008 | Obernuefemann |
| 2008/0313242 A1 | 12/2008 | Doerr |
| 2009/0049328 A1 | 2/2009 | Hattori et al. |
| 2009/0055689 A1 | 2/2009 | Petersen |
| 2009/0070337 A1 | 3/2009 | Romem et al. |
| 2009/0132543 A1 | 5/2009 | Chatley et al. |
| 2010/0071066 A1* | 3/2010 | Kline ......................... G06F 8/60 726/25 |
| 2010/0254347 A1 | 10/2010 | Muhanna et al. |
| 2011/0153770 A1 | 6/2011 | Antani et al. |
| 2012/0072723 A1 | 3/2012 | Orsini et al. |
| 2012/0117041 A1* | 5/2012 | Rodriguez ........... G06F 11/3664 707/702 |
| 2013/0042260 A1 | 2/2013 | Challenger et al. |
| 2013/0125120 A1* | 5/2013 | Zhang ................. H04L 41/0823 718/1 |
| 2013/0212064 A1* | 8/2013 | Mahmoud ......... G06F 17/30306 707/609 |
| 2013/0290399 A1 | 10/2013 | Gordon |
| 2014/0047429 A1* | 2/2014 | Gaither ..................... G06F 8/60 717/170 |
| 2014/0317448 A1* | 10/2014 | Rash ................... G06F 11/1446 714/15 |
| 2015/0154283 A1* | 6/2015 | Lightner ............. G06F 11/3409 707/770 |
| 2016/0142256 A1* | 5/2016 | Yang ................... H04L 41/0823 709/223 |
| 2016/0283304 A1* | 9/2016 | Horikawa ........... G06F 11/3409 |

FOREIGN PATENT DOCUMENTS

| | | |
|---|---|---|
| JP | 2005-50007 A | 1/2005 |
| WO | 02/067529 A2 | 8/2002 |
| WO | 2005/076120 A1 | 8/2005 |
| WO | 2007/114887 A1 | 10/2007 |
| WO | 2009/114310 A1 | 9/2009 |
| WO | 2012/104847 A1 | 8/2012 |

OTHER PUBLICATIONS

Joel C. Wu et al., "Providing Quality of Service Support in Object-Based File System", [Online], 2007, pp. 1-22, [Retrieved from Interent on Nov. 7, 2016], <http://www.crss.ucsc.edu/media/papers/wu-msst07.pdf>.*

Indradeep Ghosh et al., "Automatic Test Pattern Generation for Functional RTL Circuits Using Assignment Decision Diagrams", [Online], ACM 2000, pp. 1-6, [Retrieved from Interent on Nov. 7, 2016], <http://citeseerx.ist.psu.edu/viewdoc/download?doi=10.1.1.387.7197&rep=rep1&type=pdf>.*

Ravi Wijayaratne et al., "System support for providing integrated services from networked multimedia storage servers", [Online], pp. 270-279, [Retrieved from Internet on Nov. 7, 2016], <https://pdfs.semanticscholar.org/1870/94f25371abc9248f4aee785d5038adff6fca.pdf>.*

Patil, s. v. et al. "Unified Virtual Storage: Virtualization of Distributed Storage in a Network". International Journal of Computer Applications 2010 (0975-8887), 1(22), 30-33, 2010.

He, Xubin et al. "STICS: SCSI-TO-IP Cache for Storage Area Networks". Journal of Parallel and Distributed Computing, 64(9), 1069-1085, 2004.

Kim, Song-Kyoo. "Enhanced Management Method of Storage Area Network (SAN) Server with Random Remote Backups". Mathematical and Computer Modelling, 42(9-10), 947-958, 2005.

Wang, Wilson. "Design and Development of Ethernet-Based Storage Area Network Protocol". Networks, 1, 48-52, 2004.

Walker, Cameron et al. "Core-Edge Design of Storage Area Networks—A Single-Edge Formulation with Problem-Specific Cuts". Computers & Operations Research, 37(5), 916-926, 2010.

Burns, Randal. "Data Management in a Distributed File System for Storage Area Networks". University of California, Santa Cruz, 1-150, 2000.

Banikazemi, Mohammad et al. "Storage-Based Intrusion Detection for Storage Area Networks (SANs)". Mass Storage Systems and Technologies, 118-127, 2005.

Molero, Xavier et al. "Performance Analysis of Storage Area Networks Using High-Speed LAN Interconnects." Networks, 474-478, 2000.

Wezel, Jos et al. "First Experiences with Large SAN Storage and Linux." Nuclear Instruments and Methods in Physics Research Section A: Accelerators, Spectometers, Detectors and Associated Equipment, 534(1-2), 29-32, 2004.

Ari, Ismail et al. "SANBOOST: Automated SAN-Level Caching in Storage Area Networks". Autonomic Computing, 164-171, 2004.

Decusatis, Casimer. "Storage Area Network Application." Optical Fiber Communication Conference and Exhibit, 443-444, 2002.

Yang, Jin et al. "Performance Testing of Storage Area Network". Computer Engineering, 29(16), 43-44, 2003.

Glasshouse. New Storage Solution Description, 2010.

Lei, Shi et al. "Effective Web Objects Caching Based on ZIPF Law". Computer Engineering and Application, 61-63, 2004.

(56) References Cited

OTHER PUBLICATIONS

Wei, Gao et al. "A Caching Strategy for P2P Distributed File Storage System". Computer Engineering and Application, 84, 45-48, 2004.
Sardari, Mohsen et al. "Memory Allocation in Distributed Storage Networks", IEEE International Symposium on Information Theory Proceedings (ISIT), 1958-1962, 2010.

* cited by examiner

DEPLOYING DATA-PATH-RELATED PLUG-INS

FIELD OF PRESENTLY DISCLOSED SUBJECT MATTER

The invention relates to storage systems data-path-related plug-ins and in particular to a system and method for deploying such data-path-related plug-ins.

BACKGROUND

Distributed storage systems have rapidly developed over the last decade as networks grow in capacity and speed. With networks expanding from local area networks (LAN) to global wide area networks (WAN), businesses are becoming more globally distributed, resulting in a demand for distributed storage systems to provide data storage and access over remote geographic locations. In some cases, various entities seek for the ability to develop various distributed storage systems data-path-related plug-ins and incorporate such data-path-related plug-ins in the distributed storage systems. However, incorporating such data-path-related plug-ins in the distributed storage systems can cause unexpected or unwanted behavior, for example, data corruption, degraded performance, etc. There is thus a need in the art for a new method and system for implementing data-path-related plug-ins in distributed data storage systems.

Prior art references considered to be relevant as background to the presently disclosed subject matter are listed below. Acknowledgement of the references herein is not to be inferred as meaning that these are in any way relevant to the patentability of the presently disclosed subject matter.

U.S. Patent Publication No. 2009/0070337, "Apparatus and Method for a Distributed Storage Global Database", relates to "A geographically distributed storage system for managing the distribution of data elements wherein requests for given data elements incur a geographic inertia. The geographically distributed storage system comprises geographically distributed sites, each comprises a site storage unit for locally storing a portion of a globally coherent distributed database that includes the data elements and a local access point for receiving requests relating to ones of the data elements. The geographically distributed storage system comprises a data management module for forwarding at least one requested data element to the local access point at a first of the geographically distributed sites from which the request is received and storing the at least one requested data element at the first site, thereby to provide local accessibility to the data element for future requests from the first site while maintaining the globally coherency of the distributed database."

U.S. Pat. No. 5,987,505, "Remote Access and Geographically Distributed Computers in a Globally Addressable Storage Environment", relates to "A computer system employs a globally addressable storage environment that allows a plurality of networked computers to access data by addressing even when the data is stored on a persistent storage device such as a computer hard disk and other traditionally non-addressable data storage devices. The computers can be located on a single computer network or on a plurality of interconnected computer networks such as two local area networks (LANs) coupled by a wide area network (WAN). The globally addressable storage environment allows data to be accessed and shared by and among the various computers on the plurality of networks."

International Journal of Computer Applications 2010 (0975-8887), Volume 1-No. 22, "Unified Virtual Storage: Virtualization of Distributed Storage in a Network", Ms. S. V. Patil et al., describes "a way to efficiently utilize free disk space on Desktop machines connected over a network. In many networks today, the local disks of a client node are only used sporadically. This is an attempt to mange the data storages in a network efficiently and to provide the software support for sharing of disk space on Desktop machines in LAN. In the current situation, storage expansion on conventional servers has constraints like, maximum expansion limitation, costly affair and in case of hardware replacement, up gradation, the manual relocation of Data becomes messy. UVS (Unified Virtual Storage) is an attempt to efficiently utilize freely available disk space on Desktop machines connected over a network. Its purpose to reduce load of data traffic on network server, to efficiently utilize space on client nodes thereby avoiding wastage of space, It also eliminates Hardware restriction for storage Expansion and provides Location transparency of data store. The main advantage of UVS is that it can be seamlessly integrated into the existing infrastructure (Local Area Network system). Virtual Storage is virtually infinite supporting scalable architecture. The client node can use the Unified Virtual Drive as a single point access for Distributed Storage across different servers thereby eliminating an individual addressing of the servers. The performance of prototype implemented on a UVS Server connected by network and performance is better the n the centralized system and that the overhead of the framework is moderate even during high load."

U.S. Patent Publication No. 2011/0153770, "Dynamic Structural Management of a Distributed Caching Infrastructure", relates to "a method, system and computer program product for the dynamic structural management of an n-Tier distributed caching infrastructure. In an embodiment of the invention, a method of dynamic structural management of an n-Tier distributed caching infrastructure includes establishing a communicative connection to a plurality of cache servers arranged in respective tier nodes in an n-Tier cache, collecting performance metrics for each of the cache servers in the respective tier nodes of the n-Tier cache, identifying a characteristic of a specific cache resource in a corresponding one of the tier nodes of the n-Tier crossing a threshold, and dynamically structuring a set of cache resources including the specific cache resource to account for the identified characteristic".

SUMMARY

According to a first aspect of the presently disclosed subject matter, there is provided a method for deploying a data-path-related plug-in for a logical storage entity of a storage system, the method comprising: deploying said data-path-related plug-in for said logical storage entity, wherein said deploying includes creating a plug-in inclusive data-path specification and wherein said plug-in inclusive data-path specification includes operation of the data-path-related plug-in; and creating a verification data path specification, wherein said verification data-path specification does not include operation of the data-path-related plug-in and wherein a task executed in a verification data path, having said verification data-path specification, generates verification data that enables validation of given data generated by said task being executed in a plug-in inclusive data-path having said plug-in inclusive data-path specification.

In some cases, the data-path-related plug-in is selected from a list of data-path-related plug-in stored in a plug-in pool associated with the storage system.

In some cases, the method further comprises checking if said deploying will not result in breach of a Service Level Specification (SLS) associated with the logical storage entity and wherein said deploying and said creating are performed if said checking indicated that said deploying will not result in breach of said SLS.

In some cases, the method further comprises executing a given task on said plug-in inclusive data-path and on said verification data-path; verifying said given data using said verification data; and if any discrepancy exists between the first execution result and the second execution result, performing one or more failure actions.

In some cases, said verifying is successful if said verification data contains identical information to information contained in said given data.

In some cases, said verifying is successful if said verification data and said given data are identical.

In some cases, said one or more failure action include one or more of the following actions:
 (a) removing said non-validated data-path-related plug-in from the logical storage entity;
 (b) disabling the non-validated data-path-related plug-in for the logical storage entity;
 (c) utilizing the verification data for correcting the given data;
 (d) issuing a notification indicative of a failure to a user of the logical storage entity;
 (e) reverting to a previous version of the non-validated data-path-related plug-in if any previous version exists;
 (f) reducing a grade associated with the non-validated data-path-related plug-in.

In some cases, the method further comprises, if a validation of a non-validated data-path-related plug-in is complete, removing the verification data-path and performing one or more validation actions.

In some cases, said validation actions include one or more of the following actions:
 (a) increasing a grade associated with the non-validated data-path-related plug-in;
 (b) issuing a notification indicating that the validation is complete to a user of the logical storage entity.

In some cases, said storage system is a distributed storage system and if said checking indicated that said deploying will result in breach of said SLS the method further comprises: receiving dynamic behavior parameters data relating to dynamic behavior of the distributed storage system; calculating a reconfiguration for the distributed storage system, based, at least, on said at least one SLS, storage-related resources parameters data relating to storage related resources connected to an infrastructure layer of said distributed storage system, and dynamic behavior parameters data; and automatically allocating at least part of one of said storage-related resources according to the calculated reconfiguration.

According to a second aspect of the presently disclosed subject matter, there is provided a computer node comprising at least one processing resource configured to execute a Unified Distributed Storage Platform (UDSP) agent, wherein said UDSP agent is configured to: deploy said data-path-related plug-in for said logical storage entity, wherein said deploy includes creating a plug-in inclusive data-path specification and wherein said plug-in inclusive data-path specification includes operation of the data-path-related plug-in; and create a verification data path specification, wherein said verification data-path specification does not include operation of the data-path-related plug-in and wherein a task executed in a verification data path, having said verification data-path specification, generates verification data that enables validation of given data generated by said task being executed in a plug-in inclusive data-path having said plug-in inclusive data-path specification.

In some cases, the data-path-related plug-in is selected from a list of data-path-related plug-in stored in a plug-in pool associated with the storage system.

In some cases, said UDSP agent is further configured to check if said deploy will not result in breach of a Service Level Specification (SLS) associated with the logical storage entity and wherein said deploy and said create are performed if said check indicated that said deploy will not result in breach of said SLS.

In some cases, said UDSP agent is further configured to: execute a given task on said plug-in inclusive data-path and on said verification data-path; verify said given data using said verification data; and if any discrepancy exists between the first execution result and the second execution result, perform one or more failure actions.

In some cases, said verify is successful if said verification data contains identical information to information contained in said given data.

In some cases, said verify is successful if said verification data and said given data are identical.

In some cases, said one or more failure action include one or more of the following actions:
 (a) remove said non-validated data-path-related plug-in from the logical storage entity;
 (b) disable the non-validated data-path-related plug-in for the logical storage entity;
 (c) utilize the verification data for correcting the given data;
 (d) issue a notification indicative of a failure to a user of the logical storage entity;
 (e) revert to a previous version of the non-validated data-path-related plug-in if any previous version exists;
 (f) reduce a grade associated with the non-validated data-path-related plug-in.

In some cases, if a validation of a non-validated data-path-related plug-in is complete, said UDSP agent is further configured to remove the verification data-path and perform one or more validation actions.

In some cases, said validation actions include one or more of the following actions:
 (a) increase a grade associated with the non-validated data-path-related plug-in;
 (b) issue a notification indicating that the validation is complete to a user of the logical storage entity.

In some cases, said storage system is a distributed storage system and if said check indicated that said deploy will result in breach of said SLS, said UDSP agent is further configured to: receive dynamic behavior parameters data relating to dynamic behavior of the distributed storage system; calculate a reconfiguration for the distributed storage system, based, at least, on said at least one SLS, storage-related resources parameters data relating to storage related resources connected to an infrastructure layer of said distributed storage system, and dynamic behavior parameters data; and automatically allocate at least part of one of said storage-related resources according to the calculated reconfiguration.

According to a third aspect, there is provided a program storage device readable by machine, tangibly embodying a program of instructions executable by the machine to perform a method for deploying a data-path-related plug-in for a logical storage entity of a storage system, comprising the steps of: deploying said data-path-related plug-in for said logical storage entity, wherein said deploying includes creating a plug-in inclusive data-path specification and wherein said plug-in inclusive data-path specification includes operation of the data-path-related plug-in; and creating a verification data path specification, wherein said verification data-path specification does not include operation of the data-path-related plug-in and wherein a task executed in a verification data path, having said verification data-path specification, generates verification data that enables validation of given data generated by said task being executed in a plug-in inclusive data-path having said plug-in inclusive data-path specification.

BRIEF DESCRIPTION OF FIGURES

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
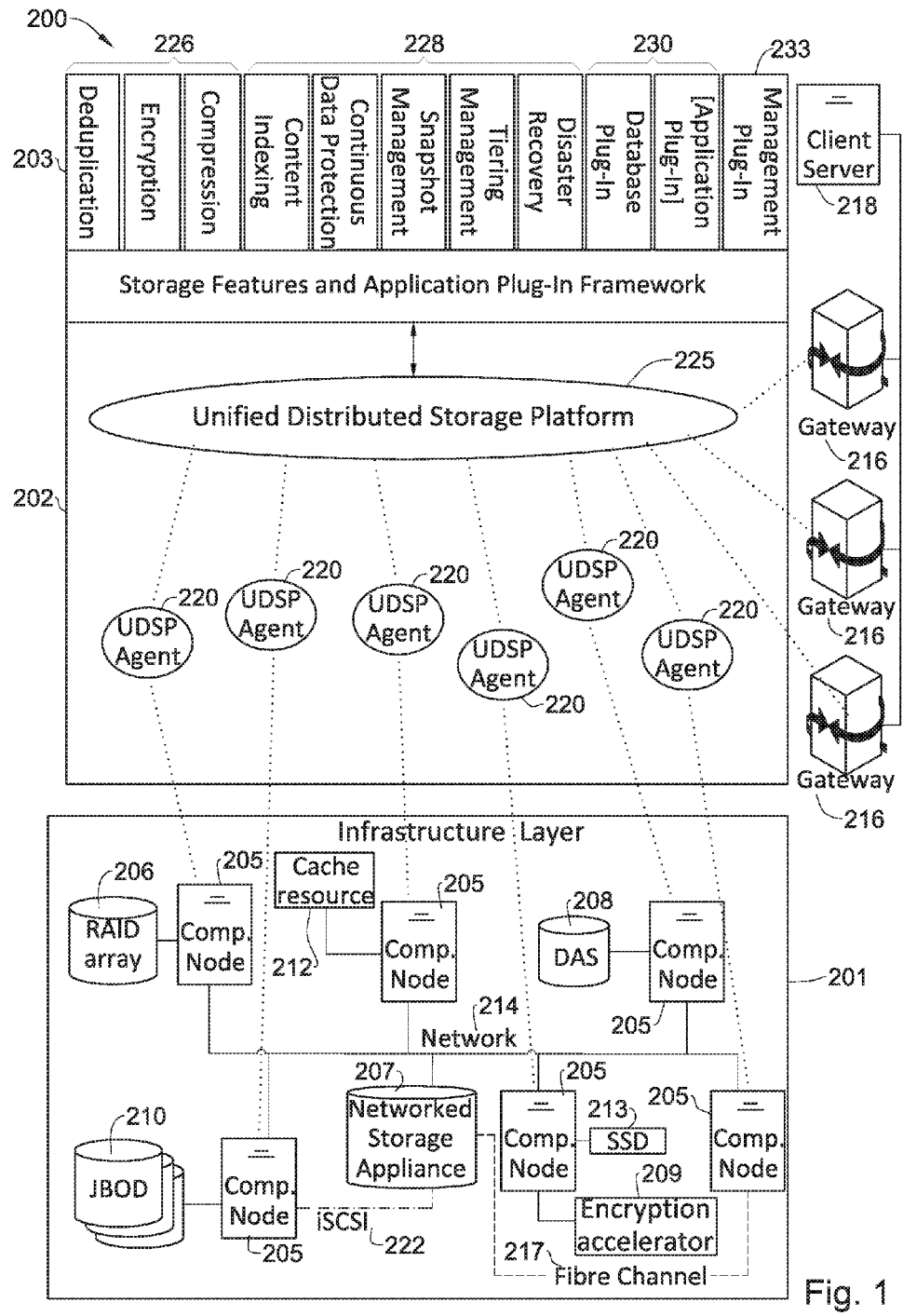
FIG. 1 schematically illustrates a top-level architecture of a Distributed Storage System including an Infrastructure Layer, according to an exemplary embodiment of the invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "creating", "receiving", "copying", "updating", "deleting" or the like, include action and/or processes of a computer that manipulate and/or transform data into other data, said data represented as physical quantities, e.g. such as electronic quantities, and/or said data representing the physical objects. The term "computer" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIGS. 2-4 and 6-10 may be executed. In embodiments of the presently disclosed subject matter one or more stages illustrated in FIGS. 2-4 and 6-10 may be executed in a different order and/or one or more groups of stages may be executed simultaneously. FIGS. 1 and 5 illustrates a general schematic of the system architecture in accordance with an embodiment of the presently disclosed subject matter. Each module in FIGS. 1 and 5 can be made up of any combination of software, hardware and/or firmware that performs the functions as defined and explained herein. The modules in FIGS. 1 and 5 may be centralized in one location or dispersed over more than one location. In other embodiments of the presently disclosed subject matter, the system may comprise fewer, more, and/or different modules than those shown in FIGS. 1 and 5.

Bearing this in mind, attention is drawn to FIG. 1, which schematically illustrates a top-level architecture of a Distributed Storage System including an Infrastructure Layer, according to the presently disclosed subject matter. According to examples of the presently disclosed subject matter, Distributed Storage System (DSS) 200 can comprise one or more of the following layers: an Infrastructure Layer 201, a Unified Distributed Storage Platform (UDSP) layer 202, and an API/framework layer 203.

According to some examples of the presently disclosed subject matter, infrastructure layer 201 can include one or more interconnected computer nodes 205 (e.g. any type of computer including, inter alia, one or more processing resources such as one or more processing units, one or more memory resources such as a memory, and one or more network interfaces), and in some cases two or more interconnected computer nodes 205, on which a more detailed description is provided herein, inter alia with reference to FIG. 5. Infrastructure layer 201 can further include one or more of the following storage-related resources: (a) data storage resources (e.g. data storage device 204, RAID (redundant array of independent disks) 206, DAS (direct attached storage) 208, JBOD (just a bunch of drives) 210, network storage appliance 207 (e.g. SAN, NAS, etc.), SSD 213, etc.); (b) cache resources 212 such as memory resources (e.g. RAM, DRAM, etc.), volatile and/or non-volatile, and/or a data storage resources (e.g. SSD 213) that in some cases can be used additionally or alternatively as a cache resource), etc.; (c) network resources 214; and (d) additional resources providing further functionality to the DSS 200 and/or enhance its performance (such as compression accelerator, encryption accelerator 209, Host Bus adapter (HBA) enabling communication with SAN resources, etc.).

In some cases, the resources can include more than one of a same type of device, and/or more than one of a different type of device. A more detailed description of some of the resources will follow herein.

According to some examples of the presently disclosed subject matter, the computer nodes 205 can be interconnected by a network (e.g. a general-purpose network).

In some cases, one or more of the resources of the infrastructure layer 201 can be connected to one or more computer nodes 205 directly. In some cases, one or more of the resources of the infrastructure layer 201 can be comprised within a computer node 205 and form a part thereof. In some cases, one or more of the resources of the infrastructure layer 201 can be connected (e.g. by a logical connection such as iSCSI 222, etc.) to one or more of the computer nodes 205 by a network (e.g. a general-purpose network).

Optionally, the network can be a general-purpose network. Optionally, the network can include a WAN. Optionally, the WAN can be a global WAN such as, for example, the Internet. Optionally, the network resources can interconnect using an IP network infrastructure. Optionally, the network can be a Storage Area Network (SAN). Optionally, the network can include storage virtualization. Optionally, the network can include a LAN. Optionally, the network infrastructure can include Ethernet, Infiniband, FC (Fibre Channel) 217, FCoE (Fibre Channel over Ethernet), etc., or any combination of two or more network infrastructures. Optionally, the network can be any type of network known in the art, including a general purpose network and/or a storage network. Optionally, the network can be any network suitable for applying an objective-based management system for allocating and managing resources within the network, as further detailed herein. Optionally, the network can be a combination of any two or more network types (including, inter alia, the network types disclosed herein).

According to some examples of the presently disclosed subject matter, at least one resource of the infrastructure layer 201 (including, inter alia, the computer nodes 205, the data storage resources, the cache resources, the network resources, additional resources connected to a computer node 205, or any other resources) can be an off-the-shelf, commodity, not purposely-built resource connected to the network and/or to one or more computer nodes 205. It is to be noted that such a resource can be interconnected as detailed herein, irrespective of the resource characteristics such as, for example, manufacturer, size, computing power, capacity, etc. Thus, any resource (including, inter alia, the computer nodes 205), irrespective of its manufacturer, which can communicate with a computer node 205, can be connected to the infrastructure layer 201 and utilized by the DSS 200 as further detailed herein. In some cases any number of resources (including, inter alia, the computer nodes 205) can be connected to the network and/or to one or more computer nodes 205 and utilized by the DSS 200, thus enabling scalability of the DSS 200. In some cases, any number of computer nodes 205 can be connected to the network and any number of resources can be connected to one or more computer nodes 205 and utilized by the DSS 200, thus enabling scalability of the DSS 200. It is to be noted that a more detailed explanation about the process of connecting new resources (including, inter alia, the computer nodes 205) to the DSS 200 is further detailed herein, inter alia with respect to FIG. 5.

Turning to the UDSP layer 202, according to some examples of the presently disclosed subject matter, it can include one or more UDSP agents 220 that can be installed on (or otherwise associated with or comprised within) one or more of the computer nodes 205. In some cases, a UDSP agent 220 can be installed on (or otherwise associated with) each of the computer nodes 205. In some cases, a UDSP agent 220 can be additionally installed on (or otherwise associated with) one or more of gateway resources 216 (that can act, inter alia, as protocol converters as further detailed herein), and in some cases, on each of the gateway resources 216. In some cases, a UDSP agent 220 can be additionally installed on (or otherwise associated with) one or more of the client servers 218 (e.g. servers and/or other devices connected to the DSS 200 as clients), and in some cases, on each of the client servers 218. It is to be noted that in some cases, client servers 218 can interact with DSS 200 directly without a need for any gateway resources 216 that are optional. It is to be further noted that in some cases there can be a difference in the UDSP agent 220 (e.g. a difference in its functionality and/or its capability, etc.) according to its installation location or its association (e.g. there can be a difference between a UDSP agent 220 installed on, or otherwise associated with, a computer node 205, a UDSP agent 220 installed on, or otherwise associated with, a gateway resources 216, a UDSP agent 220 installed on, or otherwise associated with, a client server 218, etc.).

It is to be noted that a detailed description of the UDSP agents 220 is provided herein, inter alia with respect to FIG. 5. Having said that, it is to be noted that according to some examples of the presently disclosed subject matter, UDSP agents 220 can be configured to control and manage various operations of DSS 200 (including, inter alia, automatically allocating and managing the resources of the Infrastructure Layer 201, handling data-path operations, etc.). In some cases, UDSP agents 220 can be configured to manage a connection of a new computer node 205 to the Infrastructure Layer 201 of DSS 200. In some cases, UDSP agents 220 can be configured to detect resources connected to the computer node 205 on which they are installed and to manage such resources. As indicated above, a more detailed description of the UDSP agents 220 is provided herein, inter alia with respect to FIG. 5.

In some cases, UDSP layer 202 can include UDSP 225 which includes a management system for DSS 200. Optionally, management system processing can be implemented through one or more UDSP agents 220 installed on the computer nodes 205 in Infrastructure Layer 201, or through one or more UDSP agents 220 installed on a gateway resource 216 or on a client server 218 with access to DSS 200 (e.g. directly and/or through gateway resources 216), or any combination thereof.

Management system can enable a user to perform various management tasks (including, inter alia monitoring and reporting tasks) relating to DSS 200, such as, creating new logical storage entities (such as Logical Units, Object Stores, file system instances, etc.) that can be associated with Service Level Specifications (SLSs) (in some cases, each logical storage entity is associated with a single SLS), updating logical storage entities, granting access permissions of logical storage entities to gateway resources 216 and/or to client servers 218, creating snapshots, creating backups, failover to remote site, failback to primary site, monitoring dynamic behavior of DSS 200, monitoring SLSs compliance, generation of various (e.g. pre-defined and/or user-defined, etc.) reports (e.g. performance reports, resource availability reports, inventory reports, relationship reports indicative of relationships between computer nodes 205 and other resources, trend reports and forecast reports of various parameters including Key Performance Indicators, etc.) referring to different scopes of the DSS 200 (e.g. in the resolution of the entire DSS 200, certain sites, certain types of use such as for a certain SLS, certain resources, etc.), managing various alerts provided by DSS 200 (e.g. alerts of failed hardware, etc.), etc. It is to be noted that the above management tasks are provided as non-limiting examples only. It is to be noted that in some cases, the logical storage entities can be created automatically by DSS 200 according to the SLS, as further detailed herein. It is to be noted that each of the logical storage entities can be associated with one or more data storage resources.

It is to be noted that throughout the specification, when reference is made to a user, this can refer to a human operator such as a system administrator, or to any type of auxiliary entity. An auxiliary entity can refer for example to an external application such as an external management system, including an auxiliary entity that does not require any human intervention, etc.

In some cases, management system can enable a user to provide DSS 200 with user-defined storage requirements defining a service level specification (SLS) specifying various requirements that the user requires the DSS 200 to meet. In some cases, the SLS can be associated with a logical storage entity. Optionally, the SLS can include information such as, for example, specifications of one or more geographical locations where the data is to be stored and/or handled; a local protection level defining availability, retention, recovery parameters (e.g. RPO—Recovery Point Objective, RTO—Recovery Time Objective); a backup retention policy defining for how long information should be retained; a remote protection level for disaster recovery (DR) defining one or more remote geographical locations in order to achieve specified availability, retention and recovery goals under various disaster scenarios; local and/or remote replication policy; performance levels (optionally committed) defined using metrics such as IOPS (input/output operations per second), response time, and throughput; encryption requirements; de-duplication requirements; compression requirements; a storage method (physical capacity, thin capacity/provisioning), etc.

In some cases, management system can enable management (including creation, update and deletion) of various Service Level Groups (SLGs). An SLG is a template SLS that can be shared among multiple logical storage entities. An SLG can be a partial SLS (that requires augmentation) and/or contain settings that can be overridden. Thus, for example, an SLG can define various recovery parameters only that can be inherited by various SLSs, each of which can add and/or override SLS parameters.

According to some examples of the presently disclosed subject matter, UDSP 225 can include an automatic management system for allocating resources and managing the resources in the DSS 200. Optionally, the automatic management system is an Objective-Based Management System (OBMS) 100 that can be configured to allocate and manage the resources in the network, inter alia based on any one of, or any combination of, user-defined requirements defined by one or more service level specifications (SLSs), data of various parameters relating to computer nodes 205 and/or to resources connected thereto, data of various parameters that refer to the DSS 200 or parts thereof (e.g. maximal allowed site-level over-commit, maximal allowed overall over-commit, various security parameters, etc.) and data of various parameters that refer to the dynamic behavior of the DSS 200 and the environment (e.g. the client servers 218, gateway resources 216, etc.), as further detailed herein, inter alia with respect to FIG. 2 and FIG. 5. Optionally, OBMS 100 processing can be implemented through one or more UDSP agents 220 installed on one or more of the computer nodes 205 in Infrastructure Layer 201, or through one or more UDSP agents 220 installed on a gateway resource 216 or on a client server 218 with access to DSS 200 (e.g. directly or through gateway resources 216), or any combination thereof.

According to some examples of the presently disclosed subject matter, API/framework layer 203 includes a plug-in layer which facilitates addition of software extensions (plug-ins) to DSS 200. Such plug-ins can be utilized for example for applying processes to the data, introducing new functionality and features to DSS 200, interfacing DSS 200 with specific applications and implementing application-specific tasks (e.g. storage related tasks, etc.), implementing various resource specific drivers, introducing new SLS parameters and/or parameter group/s (e.g. in relation to a plug-in functionality and/or goals), implementing management functionality, etc. In some cases, the plug-in layer can also include drivers associated with various hardware components (e.g. encryption cards, etc.).

In some cases the plug-ins can be deployed on one or more UDSP agents 220. In some cases, the plug-ins can be deployed on one or more UDSP agents 220 for example, according to the plug-in specifications (e.g. a software encryption plug-in can be installed on any UDSP agent 220), according to various resources connected to a computer node 205 and/or to a gateway resource 216 and/or to a client server 218 on which a UDSP agent 220 is installed (e.g. a hardware accelerator plug-in can be automatically deployed on each UDSP agent 220 associated with a computer node 205 that is associated with such a hardware accelerator), according to a decision of the automatic management system (e.g. OBMS 100), or according to a selection of a system administrator, etc. In some cases the plug-ins can be deployed automatically, e.g. by the automatic management system (e.g. OBMS 100) and/or by the computer nodes 205. Optionally, the software extensions can include data processing plug-ins 226 such as, for example, a data deduplication plug-in enabling for example deduplication of data stored on DSS 200, a data encryption plug-in enabling for example encryption/decryption of data stored on DSS 200, a data compression plug-in enabling for example compression/decompression of data stored on DSS 200, etc. Optionally, the software extensions can include storage feature plug-ins 228 such as, for example, a content indexing plug-in enabling for example indexing of data stored on DSS 200, a snapshot management plug-in enabling management of snapshots of data stored on DSS 200, a tiering management plug-in enabling for example tiering of data stored on DSS 200, a disaster recovery plug-in enabling for example management of process, policies and procedures related to disaster recovery, a continuous data protection plug-in enabling for example management of continuous or real time backup of data stored on DSS 200, etc. Optionally, the software extensions can include application plug-ins 230 such as, for example a database plug-in enabling for example accelerating query processing, a management plug-in 233 enabling for example performance of various DSS 200 management tasks and other interactions with users, client servers 218, and other entities connected to DSS 200, and other suitable application plug-ins. It is to be noted that a certain plug-in can implement the functionality of two or more of the various plug-ins defined above.

As indicated herein, in some cases, a plug-in can introduce new SLS parameters and/or parameter group(s) (e.g. in relation to a plug-in functionality and/or goals). In such cases, according to the plug-in functionality, respective SLS parameters and/or parameter group(s) can be introduced to DSS 200. Such introduced SLS parameters can be used in order to set plug-in related requirements, e.g. by a user and/or automatically by the automatic management system (e.g. OBMS 100), etc.

In some cases, the software extensions can be stored on one of the computer nodes 205 or distributed on more than one computer node 205. In some cases, the software extensions can be stored on one or more data storage resources connected to one or more computer nodes 205. In some cases, the software extensions can be stored in a virtual software extensions library that can be shared by the UDSP agents 220.

In some cases, the software extensions can be managed, automatically and/or manually (e.g. by a system administrator). Such management can sometimes be performed by utilizing the management plug-in 233. In such cases, management plug-in 233 can enable addition/removal of software extension to/from DSS 200, addition/removal of various software extensions to/from one or more UDSP agents 220, etc.

Figure 2:
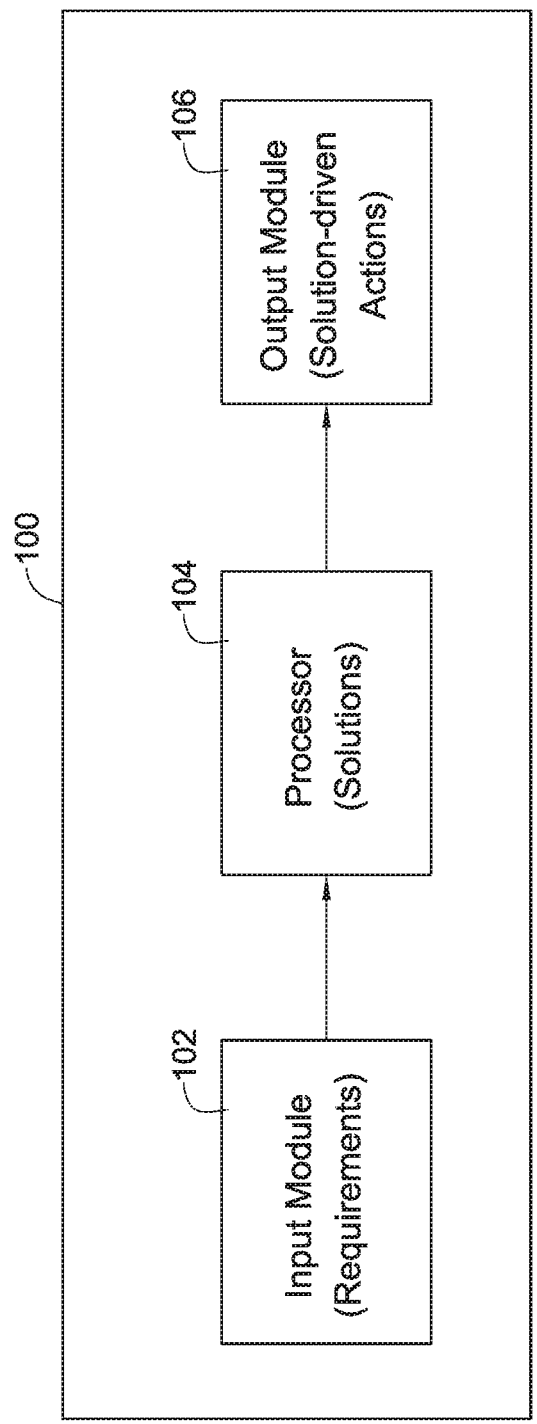
FIG. 2 schematically illustrates a simplified, exemplary system for configuring a Distributed Storage System, according to the presently disclosed subject matter.

Following the description of the top-level architecture of DSS 200, a detailed description of a DSS 200 configuration process that can be performed by Objective Based Management System (OBMS) 100 is hereby provided. For this purpose, attention is now drawn to FIG. 2, illustrating a simplified, exemplary system for configuring a Distributed Storage System 200, according to the presently disclosed subject matter. For this purpose, OBMS 100 can be configured, inter alia, to automatically allocate and manage resources in the Infrastructure Layer 201. OBMS 100 can include an Input Module 102, one or more Processors 104, and an Output Module 106.

In some cases, input Module 102 can be configured to receive input data. Such input data can include, inter alia, any one of, or any combination of, user-defined storage requirements defined by one or more service level specifications (SLSs), definitions of one or more logical storage entities, data of various parameters relating to computer nodes 205 and/or to resources connected thereto (including storage-related resources, also referred to as storage-related resources data), data of various parameters that refer to the DSS 200 or parts thereof (e.g. maximal allowed site-level over-commit, maximal allowed overall over-commit, various security parameters, etc.), data of various parameters relating to dynamic behavior (dynamic behavior parameter data) of the DSS 200 and the environment (e.g. the client servers 218, gateway resources 216, etc.), etc.

In some cases, user-defined requirements can define one or more service level specifications (SLSs) specifying various requirements that one or more users require the DSS 200 and/or one or more logical storage entities to meet.

In some cases, the data of various parameters relating to dynamic behavior of the DSS 200 and the environment (dynamic behavior parameter data) can include various parameters data indicative of the current state of one or more of the DSS 200 components (including the computer nodes 205 and the resources connected thereto). Such data can include data of presence and/or loads and/or availability and/or faults and/or capabilities and/or response time(s) and/or connectivity and/or cost(s) (e.g. costs of network links, different types of data storage resources) and/or any other data relating to one or more of the resources, including data relating to one or more computer nodes 205, one or more gateway resources 216, one or more client servers 218, etc. In some cases, such data can include, inter alia, various statistical data.

In some cases, the data of various parameters relating to computer nodes 205 and/or to resources connected thereto (including storage-related resources, also referred to as storage-related resources data) can include data of various parameters indicative of the resources of the DSS 200, including hardware resources, including storage-related resources, such as, for example:

a. parameters relating to a data storage resource, (e.g. for each of the its hard drives):
  1. Hard drive category parameters (e.g. hard drive size, interface (e.g. SAS, SATA, FC, Ultra-SCSI, etc.), cache size, special features (e.g. on-drive encryption, etc.), etc.);
  2. Hard drive performance parameters (e.g. response time, average latency, random seek time, data transfer rate, etc.);
  3. Hard drive power consumption;
  4. Hard drive reliability parameters (e.g. Mean Time Between Failure (MTBF), Annual Failure Rate (AFR), etc.).
b. computer node 205 parameters:
  1. Number of CPUs and cores per CPU.
  2. Performance parameters of each CPU and/or core, such as frequency, L2 and L3 cache sizes.
  3. Architecture (e.g. does the CPU and/or core support 64-bit computing, is it little-endian or big-endian)
  4. Support for certain instruction sets (e.g. AES-NI, a new instruction set for speeding up AES encryption).
  5. Number of hard drive slots available;
  6. Available storage interfaces (SATA, SAS, etc.);
  7. Maximal amount of memory;
  8. Supported memory configurations;
c. Cache resource parameters:
  1. Cache resource type (e.g. DRAM, SSD), size and performance.

2. Is the cached storage space local or remote.
3. NUMA parameters.
d. Gateway resource parameters:
1. Number of CPUs and cores per CPU.
2. Performance parameters of each CPU and/or core, such as frequency, L2 and L3 cache sizes.
3. Architecture (e.g. does the CPU and/or core support 64-bit computing, is it little-endian or big-endian)
4. Support for certain instruction sets (e.g. AES-NI, a new instruction set for speeding up AES encryption).
5. Number of hard drive slots available in the enclosure;
6. Available storage interfaces (SATA, SAS, etc.);
7. Maximal amount of memory;
8. Supported memory configurations;
9. Networking parameters relating to gateway (number of ports, speed and type of each port, etc.)
e. Network resource parameters:
1. Switching and routing capacities;
2. Network types;
3. Security parameters.

It is to be noted that these are mere examples and additional and/or alternative various parameters can be used.

In some cases, data relating to dynamic behavior of the DSS 200 and the environment (dynamic behavior parameter data) can include various parameters indicative of the resources of the DSS 200, including hardware resources such as, for example:
a. Parameters relating to a data storage resource (e.g. for each of its hard drives):
1. Hard drive free space.
2. S.M.A.R.T. parameters of the hard drive.
3. The power state of the hard drive (turned off, in spin-up phase, ready, etc.)
4. Recent and current load on hard drive.
5. Existing allocations and reservations.
b. Computer node 205 parameters:
1. Recent and current load statistics for each core.
2. Existing allocations and reservations.
3. Current amount of memory.
c. Cache resource parameters:
1. Available size.
2. Occupancy level of the cache.
3. Recent and current swapping/page fault statistics.
4. Existing allocations and reservations.
d. Gateway resource parameters:
1. Recent and current network connections statistics.
2. Recent and current node load statistics.
3. Recent and current latency statistics.
4. Recent and current routing cost statistics (for commands routed by a gateway into a DSS).
5. Existing allocations and reservations.
e. Network resource parameters:
1. Recent and current load of network segments.
2. Recent and current reliability and quality parameters of network segments.
3. Existing allocations and reservations.

It is to be noted that these are mere examples and additional and/or alternative various parameters can be used.

In some cases, input Module 102 can be configured to transfer the input data to one or more Processors 104. As indicated, OBMS 100 processing can be implemented through one or more UDSP agents 220 (e.g. while utilizing Objective based configuration module 380 as further detailed herein, inter alia with reference to FIG. 5), e.g. through UDSP agents 220 installed on one or more of the computer nodes 205 in Infrastructure Layer 201, or through UDSP agents 220 installed on one or more gateway resources 216, or through UDSP agents 220 installed on one or more client servers 218 with access to DSS 200 (e.g. directly or through gateway resources 216), or any combination thereof. In such cases, the one or more processors 104 can be one or more processing resources (e.g. processing units) associated with such UDSP agents 220 (e.g. if the processing is implemented through a UDSP agent 220 installed on a computer node 205, then processor can be the processing unit of that computer node 205, etc.). It is to be noted that more than one processing resource (e.g. processing unit) can be used for example in case of parallel and/or distributed processing.

The one or more Processors 104 can be configured to receive the input data from Input Module 102 and to perform an optimization process based on the input data for determining configuration requirements that meet all of the user-defined storage requirements (e.g. SLSs) provided by the one or more users of DSS 200, inter alia with respect to entities that they affect (such as logical storage entities associated with such SLSs). A more detailed description of the optimization process and of the determined configuration requirements is provided herein, inter alia with respect to FIG. 3.

The configuration requirements can be transferred to Output Module 106 which, in some cases, can determine if the current DSS 200 resources are sufficient to meet the determined configuration requirements. Accordingly, Output Module 106 can be configured to perform solution-driven actions, which include allocation, reservation, commit or over-commit (e.g. virtually allocating more resources than the actual resources available in the infrastructure layer 201) of the resources if the configuration requirements can be met by the system, or issuing improvement recommendations to be acted upon by the user which may include adding resources and/or adding plug-ins and/or any other recommendations for enabling the system to meet the configuration requirements. Such improvement recommendations can include, for example, recommendation to add one or more resources, to add or upgrade one or more plug-ins, to span the infrastructure across additional and/or different locations (local and/or remote), etc.

It is to be noted that in some cases the configuration process, or parts thereof, can be initiated when deploying the DSS 200 and/or one or more logical storage entities for the first time, and/or following one or more changes (e.g. pre-defined changes) applied to DSS 200 and/or to one or more logical storage entities (e.g. addition/removal of a resource such as computer nodes 205, cache resources, data storage resources, network resources, plug-ins or any other resource to DSS 200; a change in one or more user-defined storage requirements; etc.), and/or according to the dynamic behavior of DSS 200 (as further detailed below, inter alia with respect to FIG. 5 and FIG. 9), and/or following introduction of one or more new plug-in, and/or following updating of none or more existing plug-ins, etc. Additionally or alternatively, the configuration process, or parts thereof, can be initiated in a semi-continuous manner (e.g. at pre-determined time intervals, etc.). Additionally or alternatively, the configuration process, or parts thereof, can be performed continuously.

It is to be further noted that, with reference to FIG. 2, some of the blocks can be integrated into a consolidated block or can be broken down to a few blocks and/or other blocks may be added. It should also be noted that whilst the flow diagrams are described also with reference to system elements that realizes them, this is by no means binding, and the blocks can be performed by elements other than those described herein.

Figure 3:
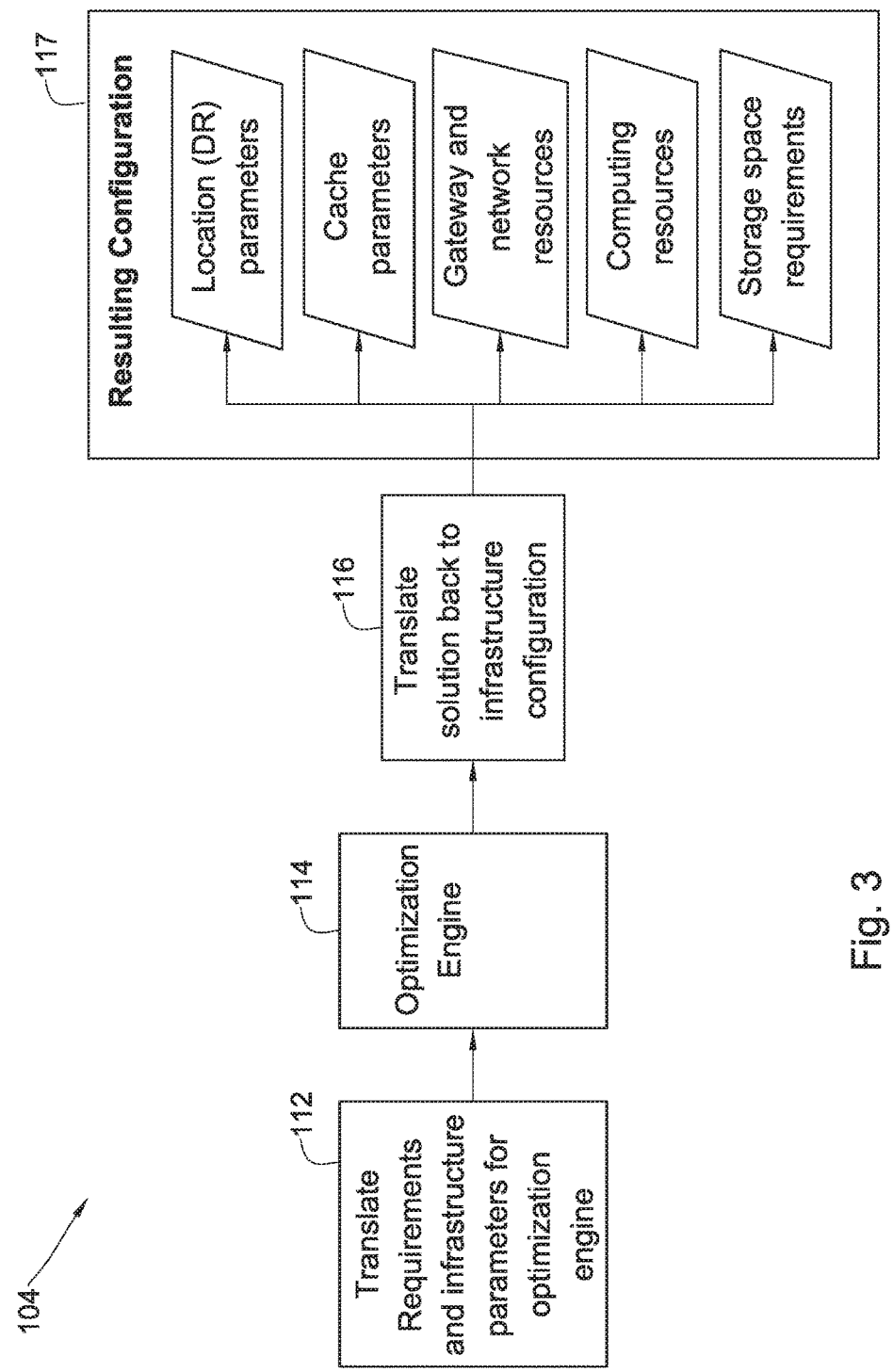
FIG. 3 schematically illustrates a simplified and exemplary flow diagram of an optimization process performed by the objective-based management system, according to the presently disclosed subject matter.

Attention is now drawn to FIG. 3, which schematically illustrates a simplified and exemplary flow diagram of an optimization process performed by the objective-based storage management system, according to the presently disclosed subject matter. In some cases, one or more Processors 104 can be configured to receive input data (e.g. from input module 102) and, in some cases, convert the received input data into a format suitable for processing by an optimization engine (e.g. into an optimization problem representation) (block 112).

An optimization engine associated with one or more Processors 104 can be configured to perform an optimization process, based on the original and/or converted input data to arrive at a required configuration which satisfies the requirements as defined by the input data (as further detailed herein, inter alia with respect to FIG. 2) (block 114). It is to be noted that in some cases, the optimization process can be instructed to return the first valid solution that it finds, whereas in other cases, the optimization process can be instructed to search for the optimal solution out of a set of calculated valid solutions. Optionally, the optimization techniques used in the optimization process can include any one of, or any combination of, linear programming, simulated annealing, genetic algorithms, or any other suitable optimization technique known in the art. Optionally, the optimization technique can utilize heuristics and/or approximations. Optionally, optimization decisions can be taken based on partial and/or not up-to-date information.

In some cases, the output of the optimization engine can be converted by the one or more Processors 104 from an optimization solution representation to a configuration requirements representation (block 116).

In some cases, the configuration requirements are output by the one or more Processors 104 for example as any one of, or any combination of, the following: location requirements (e.g. availability of at least one additional site, availability of a certain amount of storage space in the additional site/s, maximal latency between sites, minimal geographical distance between sites for example for disaster recovery purposes, etc.), cache resources requirements (e.g. required cache size, required cache type, required cache locations, required cache performance parameters, etc.), gateway resources requirements (e.g. required Fibre Channel bandwidth, required processing performance parameters, etc.), network resources requirements (e.g. required network bandwidth, required network type, etc.), computing resources requirements (e.g. computer nodes processing performance parameters, computer nodes number of CPU cores, etc.), data storage resources requirements (e.g. required storage space, required storage type, etc.), additional resource requirements (e.g. required compression performance, required encryption performance, etc.), plug-in requirements (e.g. required database plug-in, etc.), environment requirements (e.g. required physical security level, etc.), etc. (block 117).

It is to be noted that, with reference to FIG. 3, some of the blocks can be integrated into a consolidated block or can be broken down to a few blocks and/or other blocks may be added. It should also be noted that whilst the flow diagrams are described also with reference to the system elements that realizes them, this is by no means binding, and the blocks can be performed by elements other than those described herein.

Figure 4:
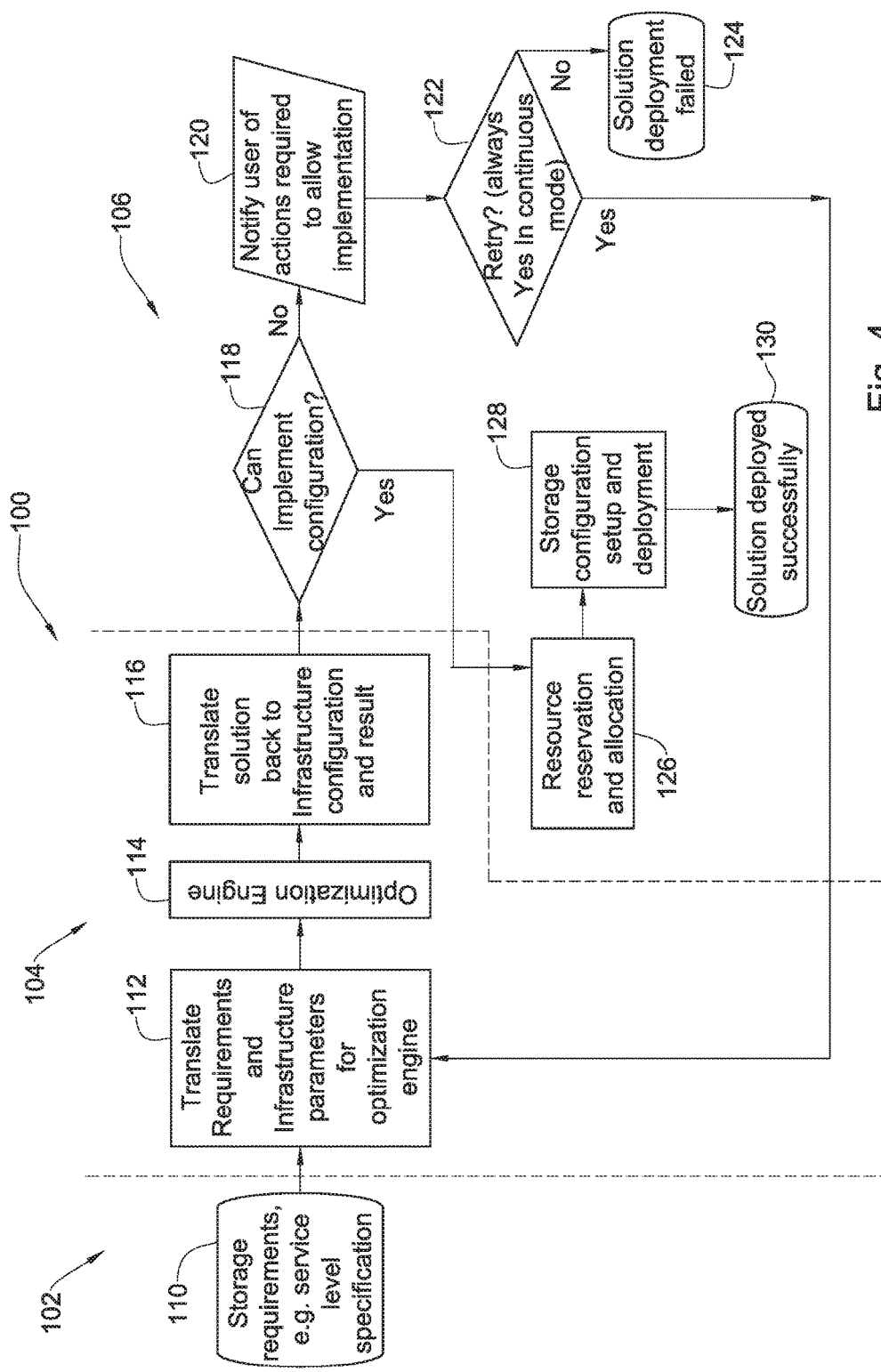
FIG. 4 schematically illustrates a simplified flow diagram of an exemplary operational algorithm of a configuration process performed by the objective-based management system, according to the presently disclosed subject matter.
Figure 5:
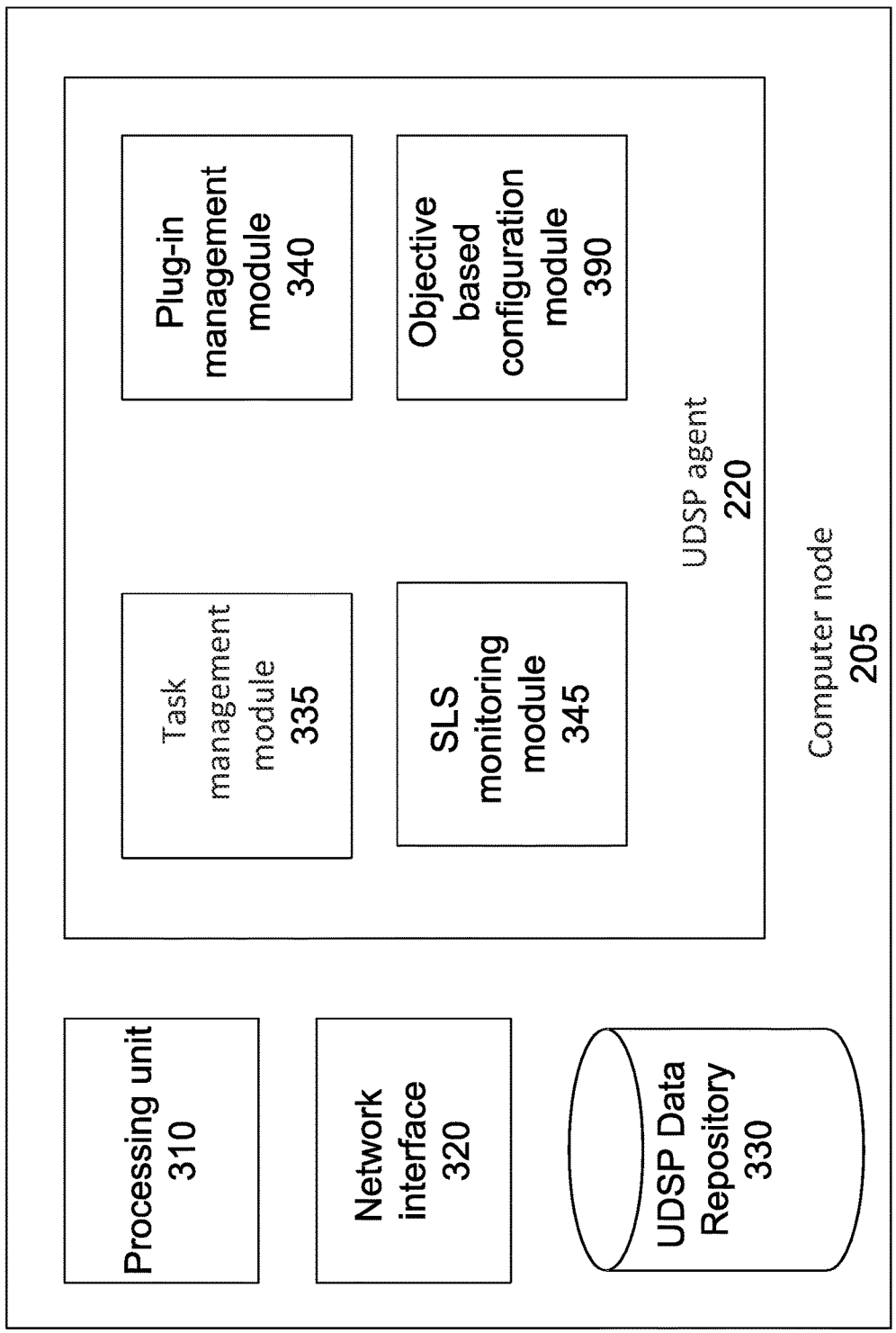
FIG. 5 is a block diagram schematically illustrating an exemplary computer node connected to the Distributed Storage System, according to certain examples of the presently disclosed subject matter.

Turning to FIG. 4, there is shown a schematic illustration of a simplified flow diagram of an exemplary operational algorithm of a configuration process performed by the objective-based management system, according to the presently disclosed subject matter. In some cases, as indicated above, Input Module 102 can receive the input data and transfer the data to the one or more Processors 104 (block 110). As further indicated above, the one or more Processors 104 can, in some cases, convert the input data into a format suitable for processing by an optimization engine (e.g. into an optimization problem representation) (block 112).

An optimization engine associated with one or more Processors 104 can be configured to perform an optimization process, based on the original and/or converted input data to arrive at a required configuration which satisfies the requirements as defined by the input data (as further detailed herein, inter alia with respect to FIG. 2) (block 114). In some cases, the output of the optimization engine can be converted by the one or more Processors 104 from an optimization solution representation to a configuration requirements representation (block 116).

In some cases, output module can compare the required configuration with the actual data of the DSS 200 resources (e.g. the computer nodes 205, the storage-related resources, etc.) and/or environment for determination if the DSS 200 can meet the required configuration (block 118). It is to be noted that in some cases the actual DSS 200 resources can refer to those parts of the DSS 200 resources that are currently available. If the actual DSS 200 resources and/or environment can meet the required configuration, OBMS 100 can be configured to reserve and/or allocate the resources according to the required configuration (block 126). In some cases, OBMS 100 can be configured to set up the DSS 200 configuration and/or perform any induced deployment actions (block 128). In some cases, the set-up and/or deployment action can include, inter alia, automatically creating new logical storage entities (such as Logical Units, Object Stores, file system instances, etc.) associated with SLSs. In some cases, each logical storage entity is associated with a single SLS. In some cases, the deployment actions can include deployment (e.g. installation) of one or more plug-ins on one or more UDSP agents 220.

As part of setting-up the storage configuration and/or performing any induced deployment actions, relevant set-up and/or deployment action requests can be sent to the UDSP agents 205; in some cases such requests are sent to the UDSP agents 205 associated with the storage-related resources relevant for the requested set-up and/or deployment action. In some cases, the UDSP agents 205 that receive such requests can be configured to update a data repository associated therewith about the set-up and/or deployment requested to be used by DSS 200 as further detailed below, inter alia with respect to FIG. 5. In some cases, following the deployment, the process of deploying the DSS 200 ends successfully (block 130).

If the actual DSS 200 resources and/or environment cannot meet the required configuration, OBMS 100 can be configured to send a message to the user (e.g. a system administrator) providing the user with a failure notification and/or recommendations as to corrective actions to be taken by the user for allowing implementation of the required infrastructure configuration (block 120). Optionally, the action can include adding infrastructure resources which will allow successful calculation of a configuration. Optionally, the action can include adding relevant plug-ins. Optionally, the action can involve spanning infrastructure resources across additional and/or alternative locations. It is to be noted that the recommendations disclosed herein are mere examples, and other recommendations can be additionally or alternatively issued to the user. In some cases, OBMS 100 can be configured to make a decision as to whether the required infrastructure configuration should be re-evaluated, optionally after some interval/delay, or not (block 122). If yes, OBMS 100 can be configured to return to block 112. Optionally, the Output Module 106 automatically goes to 112, optionally after some interval/delay, if set to a continuous mode. Optionally, the decision to retry or not is based on user input of a retry instruction. If no, the process of deploying the DSS 200 failed. In some cases, OBMS 100 can be configured to report failures.

It is to be noted that, with reference to FIG. 4, some of the blocks can be integrated into a consolidated block or can be broken down to a few blocks and/or other blocks may be added. Furthermore, in some cases, the blocks can be performed in a different order than described herein. It should be also be noted that whilst the flow diagrams are described also with reference to the system elements that realizes them, this is by no means binding, and the blocks can be performed by elements other than those described herein.

Before turning to describe FIGS. 5 to 10, it is to be noted that the subject matter disclosed with respect to FIGS. 5-8 and 10 is described with reference to a distributed storage system for illustrative purposes only. It is to be emphasized that the subject matter disclosed with respect to FIGS. 5-8 and 10 is by no means limited to a distributed storage system and it can be implemented, mutatis mutandis, on any type of storage system, including storage systems known in the art.

Attention is now drawn to FIG. 5, in which a block diagram schematically illustrating an exemplary computer node connected to the Distributed Storage System, according to certain examples of the presently disclosed subject matter, is shown.

According to some examples of the presently disclosed subject matter, computer node 205 can comprise one or more processing resources 310. The one or more processing resources 310 can be a processing unit, a microprocessor, a microcontroller or any other computing device or module, including multiple and/or parallel and/or distributed processing units, which are adapted to independently or cooperatively process data for controlling relevant computer node 205 resources and/or storage-related resources connected to computer node 205 and for enabling operations related to computer node 205 resources and/or to storage-related resources connected to computer node 205.

Computer node 205 can further comprise one or more network interfaces 320 (e.g. a network interface card, or any other suitable device) for enabling computer node 205 to communicate, inter alia with other computer nodes and/or other resources connected to DSS 200.

According to some examples of the presently disclosed subject matter, computer node 205 can be associated with a UDSP data repository 330, configured to store data, including inter alia data of various user-defined storage requirements defining SLSs, and/or data of logical storage entities associated with each SLS, and/or data of various parameters relating to computer nodes 205 and/or to storage-related resources connected thereto and/or data relating to various parameters that refer to the DSS 200 or parts thereof and/or data relating to dynamic behavior of the DSS 200 and the environment (e.g. the client servers 218, gateway resources 216, etc.), and/or data relating to the DSS 200 set-up and/or deployment and/or any other data. In some cases, UDSP data repository 330 can be further configured to enable retrieval, update and deletion of the stored data. It is to be noted that in some cases, UDSP data repository 330 can be located locally on computer node 205, on a storage-related resource connected to computer node 205 (e.g. a data storage resource, a cache resource, or any other suitable resource), on a client server 218, on a gateway resource 216, or any other suitable location. In some cases, UDSP data repository 330 can be distributed between two or more locations. In some cases, UDSP data repository 330 can be additionally or alternatively stored on one or more logical storage entities within the DSS 200. In some cases, additionally or alternatively, UDSP data repository 330 can be shared between multiple computer nodes.

According to some examples of the presently disclosed subject matter, computer node 205 can further comprise a UDSP agent 220 that can be executed, for example, by the one or more processing resources 310. As indicated above, UDSP agents 220 can be configured, inter alia, to control and manage various operations of computer node 205 and/or DSS 200. UDSP agent 220 can comprise one or more of the following modules: a task management module 335, a plug-in management module 340, an SLS monitoring module 345 and an objective based configuration module 390.

Figure 8:
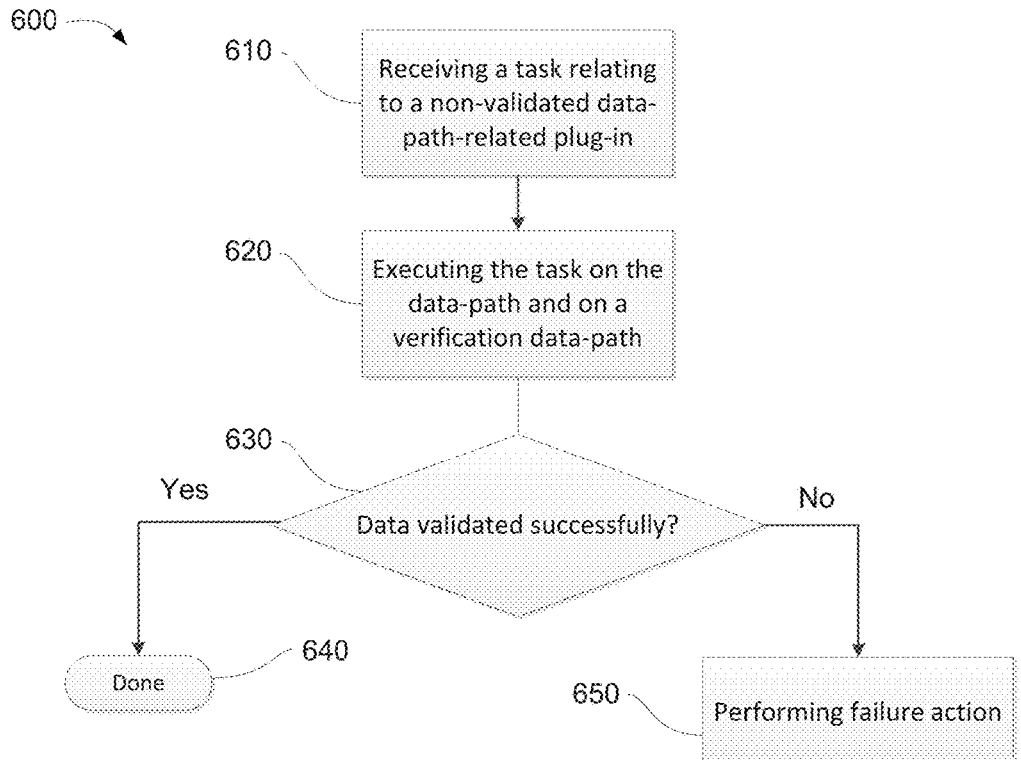
FIG. 8 is a flowchart illustrating one example of a sequence of operations carried out for executing a task relating to the data-path-related plug-in, in accordance with the presently disclosed subject matter.

According to some examples of the presently disclosed subject matter, task management module 335 can be configured to manage a received task, such as a data path operation (e.g. read/write operation), as further detailed, inter alia with respect to FIG. 8.

Figure 6:
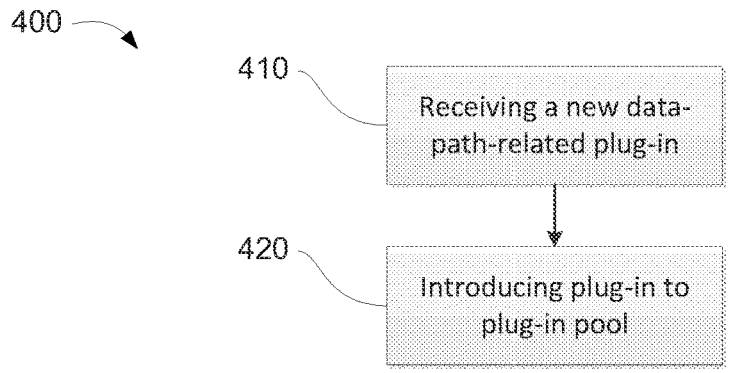
FIG. 6 is a flowchart illustrating one example of a sequence of operations carried out for introducing a new data-path-related plug-in to a plug-in layer of the Distributed Storage System, in accordance with the presently disclosed subject matter.
Figure 7:
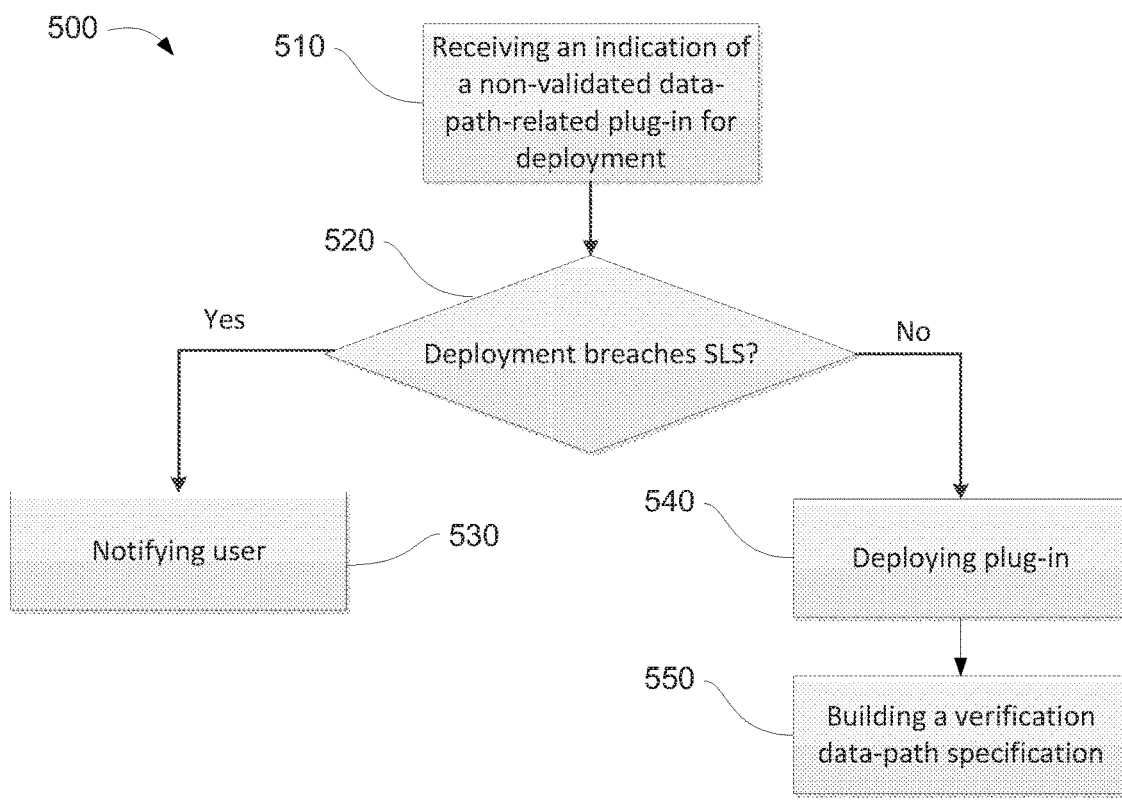
FIG. 7 is a flowchart illustrating one example of a sequence of operations carried out for deploying a non-validated data-path-related plug-in on the Distributed Storage System, in accordance with the presently disclosed subject matter.

According to some examples of the presently disclosed subject matter, plug-in management module 340 can be configured to enable introduction of new plug-ins into the DSS 200 and deployment of such plug-ins, as further detailed herein, inter alia with respect to FIGS. 6-7. In some cases, plug-in management module 340 can be further configured to validate plug-ins, as further detailed herein, inter alia with reference to FIG. 10.

Figure 9:
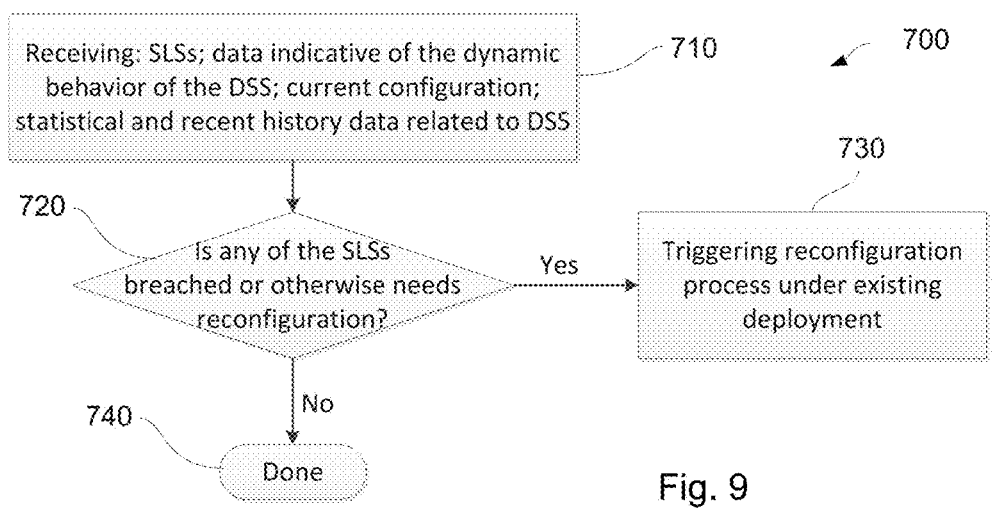
FIG. 9 is a flowchart illustrating one example of a sequence of operations carried out for managing reconfigurations of the Distributed Storage System, in accordance with the presently disclosed subject matter.

According to some examples of the presently disclosed subject matter, objective based configuration module 390 can be configured to configure and/or reconfigure DSS 200 as detailed inter alia with respect to FIG. 9.

It is to be noted that the one or more processing resources 310 can be configured to execute the UDSP agent 220 and any of the modules comprised therein.

It is to be noted that according to some examples of the presently disclosed subject matter, some or all of the UDSP agent 220 modules can be combined and provided as a single module, or, by way of example, at least one of them can be realized in the form of two or more modules. It is to be further noted that in some cases UDSP agents 220 can be additionally or alternatively installed on one or more gateway resources 216 and/or client servers 218, etc. In some cases, partial or modified versions of UDSP agents 220 can be installed on and/or used by the one or more gateway resource 216 and/or client server 218, etc.

Attention is drawn to FIG. 6, showing a flowchart illustrating one example of a sequence of operations carried out for introducing a new data-path-related plug-in to a plug-in layer of the Distributed Storage System, in accordance with the presently disclosed subject matter.

According to some examples of the presently disclosed subject matter, UDSP agent 220 (e.g. utilizing plug-in management module 340) can be configured to perform a new data-path-related plug-in introduction process 400. For this purpose, UDSP agent 220 can be configured to receive a new data-path-related plug-in to be introduced into DSS 200 (block 410). It is to be noted that in some cases such a new data-path-related plug-in can be any software extension developed by any entity. It is to be further noted that in some cases, such a new data-path-related plug-in can be developed using, inter alia, dedicated Application Programming Interfaces (APIs) specifically designed for developing software extensions to the DSS 200.

It is to be noted that a data-path is a collection of one or more operations that take place when performing an action relating to data and/or metadata associated with logical storage entities. The collection of one or more operations (such as, for example, compression, de-duplication, encryption, etc.) can be defined by a data-path specification.

In some cases, UDSP agent 220 can be further configured to introduce the new data-path-related plug-in into a plug-in pool including one or more plug-ins that can be used by DSS 200 (block 420).

It is to be noted that optionally, in some cases, prior to introduction of the new data-path-related plug-in into the plug-in pool, UDSP agent 220 can be configured to validate that the plug-in meets certain requirements (e.g. that it was developed by an authorized entity, that its purpose is authorized, that the plug-in's own requirements, for example existence of certain resources on the UDSP agent 220, will be met after deploying it for the respective logical storage entity, etc.).

It is to be noted that, with reference to FIG. 6, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 7 is a flowchart illustrating one example of a sequence of operations carried out for deploying a non-validated data-path-related plug-in on the Distributed Storage System, in accordance with the presently disclosed subject matter.

According to some examples of the presently disclosed subject matter, UDSP agent 220 (e.g. utilizing plug-in management module 340) can be configured to perform a Deploy Non-Validated Data-Path-Related Plug-In For A Logical Storage Entity process 500. For this purpose, UDSP agent 220 can be configured to receive an indication of a non-validated data-path-related plug-in to be deployed for one or more logical storage entities (block 510).

It is to be noted that in some cases, the indication can be received through a user (e.g. a system administrator, etc.) selection of a desired non-validated data-path-related plug-in from a list of available plug-ins within the plug-in pool. In some cases, the list from which the user (e.g. a system administrator, etc.) can select can be filtered to include only plug-ins that can be deployed for each logical storage entity (e.g. according to the SLS associated with the logical storage entity, according to the available resources in the DSS 200, according to a certain classification of the selecting user, etc.).

UDSP agent 220 can be optionally further configured to check, for each logical storage entity for which it is to be deployed, if deployment of the indicated plug-in for it will cause breaching (or nearing such a breach, e.g. according to pre-defined thresholds, etc.) the respective SLS associated with the respective logical storage entity (block 520).

It is to be noted that in some cases, UDSP agent 220 can be configured to utilize data about the predicted effect of deploying the plug-in (for a certain logical storage unit) on one or more SLS-related parameters thereof. In some cases, such data can be calculated using various known statistical methods and techniques (e.g. statistical assumption, etc.), based on knowledge derived from previous deployments of the respective plug-in.

In case the deployment of the indicated plug-in for any of the logical storage entities causes breaching (or nearing such a breach, e.g. according to pre-defined thresholds, etc.) the respective SLS associated with the respective logical storage entity, UDSP agent 220 can be configured to provide an appropriate notification to a user (e.g. a system administrator, etc.) with which the respective logical storage unit is associated (block 530).

Optionally, UDSP agent 220 can be additionally or alternatively configured to check if a reconfiguration of the DSS 200 can enable deployment of the plug-in without breaching (or nearing such a breach, e.g. according to pre-defined thresholds, etc.) the respective SLS associated with the respective logical storage entity. For this purpose, UDSP agent 220 can be configured to perform the reconfiguration process 700, further detailed herein, inter alia with reference to FIG. 9, mutatis mutandis (e.g. instead of utilizing the current configuration, it can utilize a configuration resulting from deployment of the plug-in).

In case the deployment of the indicated plug-in for any of the logical storage entities does not result in breaching (or nearing such a breach, e.g. according to pre-defined thresholds, etc.) the respective SLS associated with the respective logical storage entity, UDSP agent 220 can be configured to deploy the indicated plug-in for the respective logical storage entity (e.g. deploy the indicated plug-in on at least one computer node 205 having at least one UDSP agent 220 associated with the respective logical storage entity) and to generate a plug-in inclusive data-path specification which defines operation of the data-path-related plug-in (and, optionally, additional operations) (block 540).

However, while the indicated plug-in remains (or becomes) a non-validated data-path-related plug-in, UDSP agent 220 can be configured to build (or maintain) a parallel verification data-path specification which does not define operation of the data-path-related plug-in (block 550). As a result, as long as the data-path-related plug-in is not validated, every operation (e.g. read/write), or in certain cases at least part of the operations (e.g. as further detailed with respect to FIG. 8) relating to such a plug-in (e.g. using the plug-in) will be performed using two parallel data-paths— one that includes the plug-in operation (plug-in inclusive data-path which includes the operations defined by the plug-in inclusive data-path specification) and one that does not (verification data-path which includes the operations defined by the verification data-path specification), as further detailed with respect to FIG. 8. It is to be noted that the verification data-path is required to produce verification data that enables validation of the data generated by the plug-in inclusive data-path. In some cases, following execution of a common task, both data-paths are expected to generate data containing the same information (even if the data generated by one or more of the data-path is encrypted, de-duplicated, compressed, or otherwise manipulated) and in some cases, they are expected to generate identical data. It can be appreciated that in some cases, and as a non-limiting example, if the data generated by one or more of the data-paths is encrypted, de-duplicated, compressed, or otherwise manipulated, a reverse manipulation can be performed in order to extract comparable data, if required.

It is to be noted that in cases where both data-paths are expected to generate identical data, both data-paths can be required (in accordance with the respective data-path specifications) to perform common operations and/or manipulations on the data. Thus, in case the non-validated data-path-related plug-in is required to perform a certain action and/or manipulation (e.g. compression, deduplication, etc.) on the data within the plug-in inclusive data-path, the verification data-path will include a validated plug-in that performs the same action and/or manipulation, that is performed by the non-validated data-path-related plug-in, on the data.

It is to be further noted that in some cases, the verification data further enables correction of the data produced by the plug-in inclusive data-path, e.g. in cases when the validation fails.

It is to be noted that, with reference to FIG. 7, some of the blocks can be integrated into a consolidated block or can be broken down to a few blocks and/or other blocks may be added. Furthermore, in some cases, the blocks can be performed in a different order than described herein (for example, block 550 can be performed before block 540, etc.). It is to be further noted that some of the blocks are optional (e.g. blocks 520 and 530). It should be also noted that whilst the flow diagram is described also with reference to the system elements that realize them, this is by no means binding, and the blocks can be performed by elements other than those described herein.

FIG. 8 is a flowchart illustrating one example of a sequence of operations carried out for executing a task relating to the data-path-related plug-in, in accordance with the presently disclosed subject matter.

According to some examples of the presently disclosed subject matter, UDSP agent 220 (e.g. utilizing task management module 335) can be configured to perform a task execution process 600. For this purpose, UDSP agent 220 can be configured to receive a task relating to a non-validated data-path related plug-in (e.g. using the non-validated data-path related plug-in) (block 610).

In some cases, UDSP agent 220 can be configured to execute the task on the plug-in inclusive data-path on which the non-validated data-path-related plug-in operates, and on a parallel verification data-path, on which the non-validated data-path related plug-in does not operate (block 620).

Following execution of the received task on the plug-in inclusive data-path and on the verification data-path, UDSP agent 220 can utilize the verification data to validate the data generated by the plug-in inclusive data-path (block 630). If the data is valid, the process ends (block 640). In some cases an indication of the validity of the data following execution of the task on both parallel data-paths is maintained, e.g. in a counter indicative of the number of such successful task executions (a successful task execution is an execution where the data resulting from the execution of the task on the plug-in inclusive data-path is validated using the verification data resulting from the execution of the task on the verification data-path). Such a counter can be later used for the grading of the non-validated data-path-related plug-in (e.g. when a certain number of such successful task executions is reached—the grade of the non-validated data-path-related plug-in can be increased).

If, however, the data is found to be invalid, UDSP agent 220 can be configured to perform one or more failure actions (block 650). In some cases, the failure actions can include immediate removal or disablement of the non-validated data-path-related plug-in from the entire DSS 200, and in some cases from other DSSs 200 as well (e.g. utilizing a central service that supports a collection of such DSSs 200). In some cases, the failure actions can include immediate removal or disablement of the non-validated data-path from the respective logical storage entity on which the task execution was performed. Additionally or alternatively, the failure action can include utilizing the verification data in order to correct the invalid data. Additionally or alternatively, the failure action can include issuing a notification (e.g. indicative of the failure) to the user (e.g. a system administrator) of the respective logical storage entity on which the task execution was performed. Additionally or alternatively, the failure action can include issuing a notification (e.g. indicative of the failure) to all users (e.g. system administrators) of any logical storage entity for which the non-validated data-path-related plug-in is deployed. Additionally or alternatively, the failure action can include issuing a notification (e.g. indicative of the failure) to other DSSs 200 (e.g. through a central service that supports a collection of such DSSs 200). Additionally or alternatively, the failure action can include reverting to a previous version of the non-validated data-path-related plug-in, if such a previous version exists. Additionally or alternatively, the failure action can include reducing a grade of the non-validated data-path-related plug-in. It is to be noted that other and/or additional failure actions can take place. It is to be further noted that in some cases the decision of what failure actions to perform can depend on various historical data relating to the respective plug-in and/or its developer (e.g. in some cases, a plug-in associated with more historical data indicative of successful operation thereof may be treated with more tolerance than a plug-in with less historical data indicative of successful operation thereof, a plug-in developed by a developer that developed more verified plug-ins may be treated with more tolerance than a plug-in developed by a developer that developed less verified plug-ins, etc.).

In some cases, the grade of the non-validated data-path-related plug-in can be increased, inter alia, every pre-determined time window and/or every pre-determined number of successful executions of tasks and/or otherwise.

It is to be noted that optionally, in some cases, e.g. according to the grade of the non-validated data-path-related plug-in, not every task relating to the non-validated data-path-related plug-in is executed on both parallel data-paths. In some cases, only some of such tasks are executed on both parallel data-paths. In some cases, the higher the grade of the non-validated data-path-related plug-in, the lower the number of tasks executed on both parallel data-paths. In some cases, a task is executed on both parallel data-paths only every pre-determined number of executions (e.g. every second execution, every ten executions, or every other pre-determined number of executions). In some cases, a task is executed on both parallel data-paths every certain time interval, e.g. as determined and controlled by an external entity.

It is to be noted that, with reference to FIG. 8, some of the blocks can be integrated into a consolidated block or can be broken down to a few blocks and/or other blocks may be added. It should be also noted that whilst the flow diagram is described also with reference to the system elements that realize them, this is by no means binding, and the blocks can be performed by elements other than those described herein.

FIG. 9 is a flowchart illustrating one example of a sequence of operations carried out for managing reconfigurations of the Distributed Storage System, in accordance with the presently disclosed subject matter.

According to some examples of the presently disclosed subject matter, in some cases, a reconfiguration process 900 checking if a reconfiguration of DSS 200 is required can be performed. In some cases, such a check can be performed periodically (e.g. according to a pre-defined time interval, for example, every minute, every five minutes, every hour, or any other pre-defined time interval), continuously (e.g. in a repeating loop, etc.), following a triggering event (e.g. a monitored parameter exceeds a pre-defined or calculated threshold, receipt of a recommendation from a UDSP agent 220 associated with a computer node 205, as detailed inter alia with respect to FIG. 10, etc.), etc.

As indicated herein, in some cases, each UDSP agent 220 associated with a computer node 205 can be configured to perform the reconfiguration process 700, e.g. while utilizing objective based configuration module 390. In some cases, UDSP agents 220 associated with one or more computer nodes 205 (e.g. dedicated computer nodes) can be responsible for performing the reconfiguration process 700, e.g. while utilizing objective based configuration module 390.

In some cases, objective based configuration module 390 can be configured to receive any one of, or any combination of, SLSs associated with one or more logical storage entities in DSS 200, data indicative of the dynamic behavior of the DSS 200 and its resources and environment, data indicative of the current configurations of DSS 200, statistical data and historical data related to DSS 200, etc. (block 710). It is to be noted that in some cases all or part of the data can additionally or alternatively be retrieved from the UDSP data repository 330 associated with computer node 205 on which the reconfiguration process 900 is performed.

In some cases, objective based configuration module 390 can be configured to utilize the received data for checking if any of the SLSs are breached (or close to be breached, e.g. according to pre-defined thresholds, etc.) and/or if there is any other reason (e.g. failure to perform one or more assignments irrespective of an SLS, etc.) for performing a reconfiguration of the DSS 200 (block 720).

It is to be noted that in some cases, every time an SLS is breached (it should be noted that breach of an SLS can sometimes include nearing such a breach, e.g. according to pre-defined thresholds, etc.) a reconfiguration of DSS 200 can be initiated. In other cases such reconfiguration of DSS 200 can be initiated depending on meeting some pre-defined criteria. Such criteria can be, for example, a pre-defined number of detected SLS breaches required to be met, either within a pre-defined time frame or irrespective of the time, etc. Thus, for example, exemplary criteria can be detection of three SLS breaches, or detection of three SLS breaches within one day, etc. In some cases, the importance of a breach can additionally or alternatively be considered as a criterion. For this purpose, objective based configuration module 390 can be configured to utilize the statistical data and historical data related to DSS 200.

In case there is a need to reconfigure DSS 200, objective based configuration module 390 can be configured to activate the Objective Based Management System (OBMS) 100 for performing a DSS 200 configuration process, as detailed above, inter alia with respect to FIGS. 2-4 (block 730). It is to be noted, as indicated herein, that in cases of reconfiguration of DSS 200, OBMS 100 can receive the current configurations of DSS 200 as part of the inputs for the configuration process and take it into consideration when reconfiguring DSS 200. In some cases, during such reconfiguration, OBMS 100 can be configured to reserve and/or allocate and/or reallocate and/or free all or part of the resources.

It is to be noted that in some cases, in addition or alternatively to reconfiguring the DSS 200, objective based configuration module 390 can be configured to perform one or more SLS-related corrective actions. In some cases, the SLS-related corrective actions can include immediate removal of the non-validated data-path-related plug-in from the entire DSS 200 (including any logical storage entity for which it is deployed) and in some cases from other DSSs 200 as well (e.g. utilizing a central service that supports a collection of such DSSs 200). In some cases, the SLS-related corrective actions can include immediate removal of the non-validated data-path from the respective logical storage entity on which the task execution was performed. Additionally or alternatively, the SLS-related corrective actions can include issuing a notification (e.g. indicative of the breach or nearing a breach) to the user (e.g. a system administrator) of the respective logical storage entity. Additionally or alternatively, the SLS-related corrective actions can include issuing a notification (e.g. indicative of the breach or nearing a breach) to all users (e.g. system administrators) of any logical storage entity for which the non-validated data-path-related plug-in is deployed. Additionally or alternatively, the SLS-related corrective action can include issuing a notification (e.g. indicative of the failure) to other DSSs 200 (e.g. through a central service that supports a collection of such DSSs 200). Additionally or alternatively, the SLS-related corrective actions can include reverting to a previous version of the non-validated data-path-related plug-in, if such a previous version exists. Additionally or alternatively, the SLS-related corrective actions can include reducing a grade of the non-validated data-path-related plug-in. It is to be noted that other and/or additional SLS-related corrective actions can take place. It is to be further noted that in some cases the decision of what SLS-related corrective actions to perform can depend on various historical data relating to the respective plug-in and/or its developer (e.g. in some cases, a plug-in associated with more historical data indicative of successful operation thereof may be treated with more tolerance than a plug-in with less historical data indicative of successful operation thereof; a plug-in developed by a developer that developed more verified plug-ins may be treated with more tolerance than a plug-in developed by a developer that developed less verified plug-ins; etc.).

Returning to FIG. 9, if no SLS is breached (or is close to be breached) and there is no other reason for performing a reconfiguration, or following initiation of a reconfiguration of DSS 200, reconfiguration process 900 ends (block 740).

It is to be noted that, with reference to FIG. 9, some of the blocks can be integrated into a consolidated block or can be broken down to a few blocks and/or other blocks may be added. It should be also noted that whilst the flow diagram is described also with reference to the system elements that realize them, this is by no means binding, and the blocks can be performed by elements other than those described herein.

Figure 10:
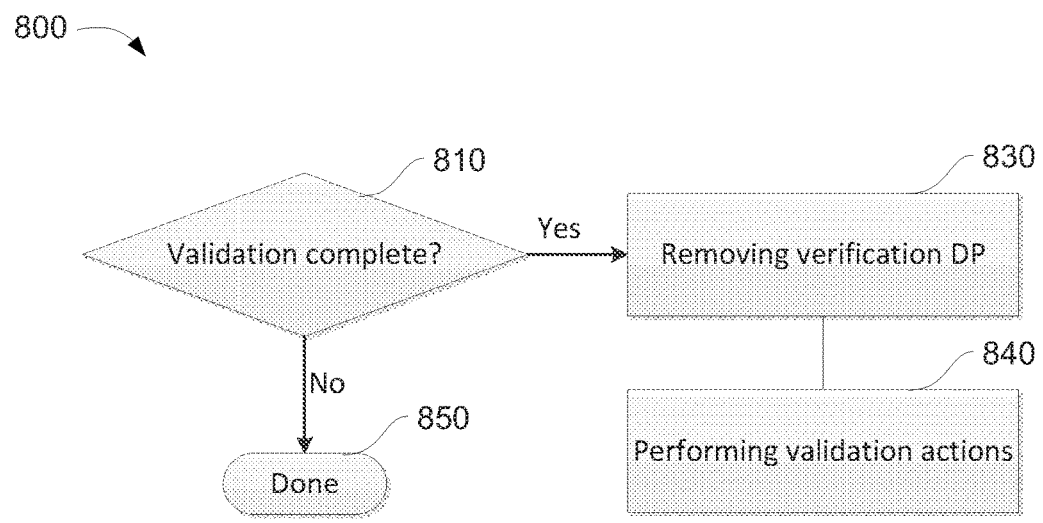
FIG. 10 is a flowchart illustrating one example of a sequence of operations carried out for validating a data-path-related plug-in, in accordance with the presently disclosed subject matter, in accordance with the presently disclosed subject matter.

FIG. 10 is a flowchart illustrating one example of a sequence of operations carried out for validating a data-path-related plug-in, in accordance with the presently disclosed subject matter.

According to some examples of the presently disclosed subject matter, UDSP agent 220 (e.g. utilizing task management module 335) can be configured to perform a validation process 800 for non-validated data-path-related plug-ins. For this purpose, UDSP agent 220 can be configured to check if the validation of a non-validated data-path-related plug-in is complete (block 810). In some cases, such a check can be performed periodically (e.g. according to a pre-defined time interval, for example, every minute, every five minutes, every hour, or any other pre-defined time interval), continuously (e.g. in a repeating loop, etc.), following a triggering event (e.g. following a successful execution of a task, following an increase in the grade of the non-validated data-path-related plug-in, etc.), etc.

In some cases, a plug-in validation is complete after a pre-determined number of successful task executions relating to the respective plug-in. Alternatively or additionally, a plug-in validation is complete after a certain (e.g. pre-determined) amount of data, generated using the non-validated data-path, has been successfully verified. Alternatively or additionally, a plug-in validation is complete after authorization by a user (e.g. a system administrator). It is to be noted that in some cases other parameters and/or criteria can be used for determining if the validation is complete.

If the validation is not complete, the process ends (block 850). If however, the validation is complete, and the data-path-related plug-in is validated, UDSP agent 220 can be configured to remove the verification data-path specification from the respective logical storage entity (block 830) and perform one or more validation actions (block 840). In some cases, the validation actions can include increasing a grade of the now validated data-path-related plug-in. In some cases, the validation actions can additionally or alternatively include removing any verification data-path specifications relating to the now validated data-path-related plug-in from the entire DSS 200 (including any logical storage entity for which it is deployed) and in some cases from other DSSs 200 as well (e.g. utilizing a central service that supports a collection of such DSSs 200). Additionally or alternatively, the validation actions can include issuing a notification (indicative of the validation of the plug-in) to the user (e.g. a system administrator) of the respective logical storage entity on which the task execution was performed. Additionally or alternatively, the validation actions can include issuing a notification (indicative of the validation of the plug-in) to all users (e.g. system administrators) of any logical storage entity for which the now validated data-path-related plug-in is deployed. Additionally or alternatively, the validation actions can include issuing a notification (e.g. indicative of the failure) to other DSSs 200 (e.g. through a central service that supports a collection of such DSSs 200).

It is to be noted that, with reference to FIG. 10, some of the blocks can be integrated into a consolidated block or can be broken down to a few blocks and/or other blocks may be added. Furthermore, in some cases, the blocks can be performed in a different order than described herein (for example, block 840 can be performed before block 830, etc.). It should be also noted that whilst the flow diagram is described also with reference to the system elements that realize them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

What is claimed is:

1. A method for deploying a data-path-related plug-in for a logical storage entity of a storage system, the method comprising:
    deploying said data-path-related plug-in for said logical storage entity, wherein said deploying includes creating a plug-in inclusive data-path specification and wherein said plug-in inclusive data-path specification includes operation of the data-path-related plug-in;
    creating a verification data-path specification, wherein said verification data-path specification does not include operation of the data-path-related plug-in and wherein a task executed in a verification data-path, having said verification data-path specification, generates verification data that enables validation of given data generated by said task being executed in a plug-in inclusive data-path having said plug-in inclusive data-path specification;
    executing a given task on said plug-in inclusive data-path and on said verification data-path, giving rise to said given data and to said verification data;
    verifying said given data using said verification data; and
    if said verifying failed, performing one or more failure actions, wherein said one or more failure actions include one or more of the following actions:
        (a) removing the data-path-related plug-in with failed verification from the logical storage entity;
        (b) disabling the data-path-related plug-in with failed verification for the logical storage entity;
        (c) utilizing the verification data for correcting the given data;
        (d) issuing a notification indicative of a failure to a user of the logical storage entity;
        (e) reverting to a previous version of the data-path-related plug-in with failed verification if any previous version exists;
        (f) reducing a grade associated with the data-path-related plug-in with failed verification.

2. The method of claim 1, wherein the data-path-related plug-in is selected from a list of data-path-related plug-ins stored in a plug-in pool associated with the storage system.

3. The method of claim 1, further comprising:
    checking if said deploying will not result in a breach of a Service Level Specification (SLS) associated with the logical storage entity and wherein said deploying and said creating are performed if said checking indicated that said deploying will not result in the breach of said SLS.

4. The method of claim 1, wherein said verifying is successful if said verification data contains identical information to information contained in said given data.

5. The method of claim 4, wherein said verifying is successful if said verification data and said given data are identical.

6. The method of claim 1, further comprising:
    if a validation of a non-validated data-path-related plug-in is complete, removing the verification data-path and performing one or more validation actions.

7. The method of claim 6, wherein said one or more validation actions include one or more of the following actions: (a) increasing a grade associated with the non-validated data-path-related plug-in; (b) issuing a notification indicating that the validation is complete to a user of the logical storage entity.

8. The method of claim 3, wherein said storage system is a distributed storage system and wherein if said checking indicated that said deploying will result in a breach of said SLS the method further comprises:
- receiving dynamic behavior parameters data relating to dynamic behavior of the distributed storage system;
- calculating a reconfiguration for the distributed storage system based at least on said at least one SLS, storage-related resources parameters data relating to storage related resources connected to an infrastructure layer of said distributed storage system, and dynamic behavior parameters data; and
- automatically allocating at least part of one of said storage-related resources according to the calculated reconfiguration.

9. A system comprising at least one central processing unit (CPU) configured to execute a Unified Distributed Storage Platform (UDSP) agent, wherein said UDSP agent is configured to:
- deploy a data-path-related plug-in for a logical storage entity, wherein said deploying includes creating a plug-in inclusive data-path specification and wherein said plug-in inclusive data-path specification includes operation of the data-path-related plug-in;
- create a verification data-path specification, wherein said verification data-path specification does not include operation of the data-path-related plug-in and wherein a task executed in a verification data-path, having said verification data-path specification, generates verification data that enables validation of given data generated by said task being executed in a plug-in inclusive data-path having said plug-in inclusive data-path specification;
- execute a given task on said plug-in inclusive data-path and on said verification data-path, giving rise to said given data and to said verification data;
- verify said given data using said verification data; and
- if said verifying failed, perform one or more failure actions, wherein said one or more failure actions include one or more of the following actions:
  - (a) remove the data-path-related plug-in with failed verification from the logical storage entity;
  - (b) disable the data-path-related plug-in with failed verification for the logical storage entity;
  - (c) utilize the verification data for correcting the given data;
  - (d) issue a notification indicative of a failure to a user of the logical storage entity;
  - (e) revert to a previous version of the data-path-related plug-in with failed verification if any previous version exists;
  - (f) reduce a grade associated with the data-path-related plug-in with failed verification.

10. The system of claim 9, wherein the data-path-related plug-in is selected from a list of data-path-related plug-ins stored in a plug-in pool associated with the storage system.

11. The system of claim 9, wherein said UDSP agent is further configured to check if said deploying will not result in a breach of a Service Level Specification (SLS) associated with the logical storage entity and wherein said deploying and said creating are performed if said check indicated that said deploying will not result in a breach of said SLS.

12. The system of claim 9, wherein said verifying is successful if said verification data contains identical information to information contained in said given data.

13. The system of claim 12, wherein said verifying is successful if said verification data and said given data are identical.

14. The system of claim 9, wherein if a validation of a non-validated data-path-related plug-in is complete, said UDSP agent is further configured to remove the verification data-path and perform one or more validation actions.

15. The system of claim 14, wherein said one or more validation actions include one or more of the following actions: (a) increase a grade associated with the non-validated data-path-related plug-in; (b) issue a notification indicating that the validation is complete to a user of the logical storage entity.

16. The system of claim 11, wherein said storage system is a distributed storage system and wherein, if said checking indicated that said deploying will result in a breach of said SLS, said UDSP agent is further configured to:
- receive dynamic behavior parameters data relating to dynamic behavior of the distributed storage system;
- calculate a reconfiguration for the distributed storage system based at least on said at least one SLS, storage-related resources parameters data relating to storage related resources connected to an infrastructure layer of said distributed storage system, and dynamic behavior parameters data; and
- automatically allocate at least part of one of said storage-related resources according to the calculated reconfiguration.

17. A non-transitory, machine-readable program storage device that stores a program of machine-executable instructions, that, when executed by the machine, cause the machine to perform a method for deploying a data-path-related plug-in for a logical storage entity of a storage system, the method for deploying the data-path-related plug-in comprising the steps of:
- deploying said data-path-related plug-in for said logical storage entity, wherein said deploying includes creating a plug-in inclusive data-path specification and wherein said plug-in inclusive data-path specification includes operation of the data-path-related plug-in;
- creating a verification data-path specification, wherein said verification data-path specification does not include operation of the data-path-related plug-in and wherein a task executed in a verification data-path, having said verification data-path specification, generates verification data that enables validation of given data generated by said task being executed in a plug-in inclusive data-path having said plug-in inclusive data-path specification;
- executing a given task on said plug-in inclusive data-path and on said verification data-path, giving rise to said given data and to said verification data;
- verifying said given data using said verification data; and
- if said verifying failed, performing one or more failure actions, wherein said one or more failure actions include one or more of the following actions:
  - (a) removing the data-path-related plug-in with failed verification from the logical storage entity;
  - (b) disabling the data-path-related plug-in with failed verification for the logical storage entity;
  - (c) utilizing the verification data for correcting the given data;
  - (d) issuing a notification indicative of a failure to a user of the logical storage entity;
  - (e) reverting to a previous version of the data-path-related plug-in with failed verification if any previous version exists;

(f) reducing a grade associated with the data-path-related plug-in with failed verification.

\* \* \* \* \*